(12) United States Patent
Shimamura et al.

(10) Patent No.: US 9,184,449 B2
(45) Date of Patent: Nov. 10, 2015

(54) OXYGEN PERMEABLE FILM, OXYGEN PERMEABLE SHEET, AND CELL INCLUDING THESE

(75) Inventors: Harunari Shimamura, Osaka (JP);
Koshi Takamura, Osaka (JP);
Nobuharu Koshiba, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1546 days.

(21) Appl. No.: 11/577,733

(22) PCT Filed: Aug. 9, 2005

(86) PCT No.: PCT/JP2005/014578
§ 371 (c)(1),
(2), (4) Date: Apr. 23, 2007

(87) PCT Pub. No.: WO2006/043363
PCT Pub. Date: Apr. 27, 2006

(65) Prior Publication Data
US 2009/0202876 A1    Aug. 13, 2009

(30) Foreign Application Priority Data

Oct. 21, 2004 (JP) ................................ 2004-307150
Apr. 7, 2005 (JP) ................................ 2005-110458

(51) Int. Cl.
*H01M 12/00* (2006.01)
*H01M 12/04* (2006.01)
(Continued)

(52) U.S. Cl.
CPC .......... *H01M 4/8605* (2013.01); *H01M 8/0239* (2013.01); *H01M 8/0245* (2013.01); *H01M 8/04171* (2013.01); *H01M 12/06* (2013.01); *H01M 8/10* (2013.01); *Y02E 60/50* (2013.01); *Y10T 428/24331* (2015.01);
(Continued)

(58) Field of Classification Search
USPC ....................................................... 429/474
See application file for complete search history.

(56) References Cited

U.S. PATENT DOCUMENTS 4,468,360 A * 8/1984 Kadija ............................ 264/83
4,731,304 A * 3/1988 Lundquist et al. .............. 429/62
(Continued)

FOREIGN PATENT DOCUMENTS

CN       1450677       10/2003
EP       0 621 236     10/1993
(Continued)

OTHER PUBLICATIONS

Korean Office Action Dated Apr. 9, 2008.
(Continued)

*Primary Examiner* — Jacob Marks
(74) *Attorney, Agent, or Firm* — Dickinson Wright PLLC

(57) ABSTRACT

An oxygen permeable film including an aggregate of water-repellent particles and having an average particle size of the particles of 0.01 to 50 μm has a contact angle with water of not less than 120° and super water repellency, and therefore has an excellent water vapor permeation inhibiting capability. As the particles, fluorocarbon resins such as polytetrafluoroethylene, polyvinyl fluoride and polyvinylidene fluoride are suitable. The specific surface area of the oxygen permeable film is preferably not less than 0.1 m$^2$/g and not more than 500 m$^2$/g.

17 Claims, 4 Drawing Sheets

(51) Int. Cl.
*H01M 4/86* (2006.01)
*H01M 8/02* (2006.01)
*H01M 8/04* (2006.01)
*H01M 12/06* (2006.01)
*H01M 8/10* (2006.01)

(52) U.S. Cl.
CPC ................ *Y10T 428/249953* (2015.04); *Y10T 428/249981* (2015.04); *Y10T 428/25* (2015.01); *Y10T 428/254* (2015.01); *Y10T 442/10* (2015.04); *Y10T 442/60* (2015.04)

(56) References Cited

U.S. PATENT DOCUMENTS

| | | | |
|---|---|---|---|
| 4,832,712 A | | 5/1989 | Ohmori et al. |
| 5,563,004 A | * | 10/1996 | Buzzelli et al. ............... 429/405 |
| 5,712,062 A | * | 1/1998 | Yamana et al. ............ 429/231.7 |
| 5,840,235 A | * | 11/1998 | Yagi et al. .................. 264/288.8 |
| 6,068,921 A | | 5/2000 | Yamana |
| 2002/0197524 A1 * | | 12/2002 | Xie et al. ........................ 429/44 |
| 2003/0194599 A1 | | 10/2003 | Sassa |
| 2004/0048125 A1 * | | 3/2004 | Curelop et al. ................. 429/27 |
| 2004/0241537 A1 * | | 12/2004 | Okuyama et al. ............... 429/86 |
| 2005/0026028 A1 * | | 2/2005 | Ouchi et al. .................... 429/38 |

FOREIGN PATENT DOCUMENTS

| | | | |
|---|---|---|---|
| EP | 1 139 470 | | 10/2001 |
| JP | 58225575 | | 12/1983 |
| JP | 59075582 | | 4/1984 |
| JP | 64083503 | | 3/1989 |
| JP | 04312771 | | 11/1992 |
| JP | 07-014565 | * | 6/1993 |
| JP | 06044954 | | 2/1994 |
| JP | 06-256008 | | 9/1994 |
| JP | 06/262693 | | 9/1994 |
| JP | 07-014565 | | 1/1995 |
| JP | 07014565 | | 1/1995 |
| JP | 07-130405 | | 5/1995 |
| JP | 63116725 | | 5/1998 |
| JP | 2001079369 | | 3/2001 |
| JP | 2003-268675 | | 9/2003 |
| KR | 100245913 | | 12/1994 |
| KR | 2001-0080458 | | 8/2001 |
| WO | 03/093388 | | 11/2003 |

OTHER PUBLICATIONS

PCT International Search Report dated Oct. 25, 2005.
Chinese Office Action dated Jun. 27, 2008 with partial English translation thereof.
Extended European Search Report dated Jan. 25, 2010.
Japanese Office action dated Sep. 1, 2011.

* cited by examiner

F I G. 2A
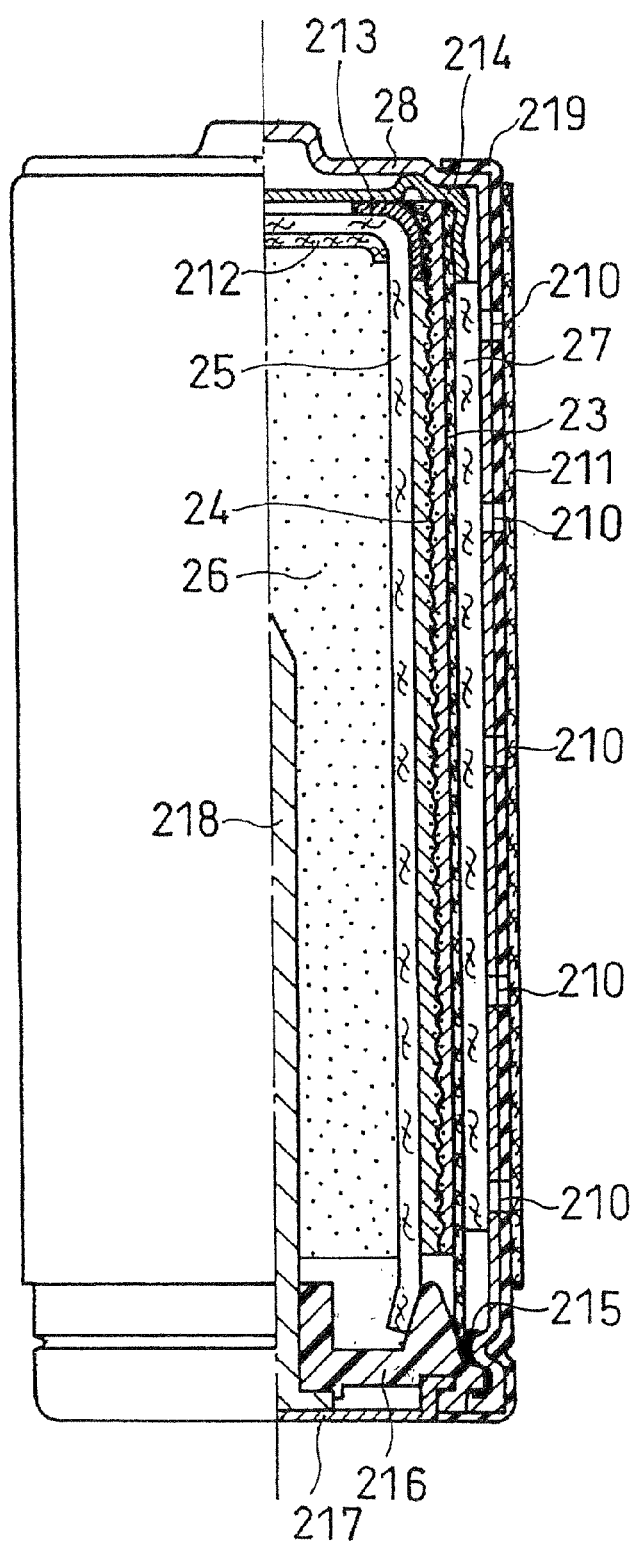

US 9,184,449 B2

OXYGEN PERMEABLE FILM, OXYGEN PERMEABLE SHEET, AND CELL INCLUDING THESE

TECHNICAL FIELD

The present invention relates mainly to an oxygen permeable film, and particularly relates to a film that selectively allows oxygen to permeate therethrough, while inhibiting the permeation of water vapor. The oxygen permeable film may be applied, for example, to an air (oxygen) intake mechanism of air cells and fuel cells that takes in oxygen in the atmosphere. In other words, the present invention relates to an air purification film that removes water vapor from the atmosphere.

BACKGROUND ART

In order to prevent the entrance of moisture along with oxygen, various contrivances have been made to many elements and devices utilizing oxygen in air, such as air cells and fuel cells. In the case of an air cell, for example, the entrance of water vapor in the atmosphere into the cell causes the concentration change or volume change of the electrolyte, thus degrading the discharge characteristics.

Therefore, it has been proposed to provide an oxygen-selective permeable film comprising a siloxane-based compound and an oxygen-permeable solution layer at the air intake opening of an air cell, thereby preventing the entrance of water vapor in the atmosphere into the cell (Patent Document 1).

Further, an air cell has also been proposed in which a uniform film or the like is provided with plural permeable pores of not more than 300 μm for passing air and that uses this as a selective permeable film for inhibiting the permeation of water vapor (Patent Document 2).

Further, although not in the field of batteries, in the case of a radio antenna used in a heavy snowfall area, snow or ice attached to the surface of the antenna may reduce the electric field strength, thus causing deterioration in the quality of telecommunication. In order to prevent this, a technique is available in which PTFE (polytetrafluoroethylene) particles are applied as the snow resistant material to the surface of the antenna, using a binder (Non-Patent Document 1).

Patent Document 1: Japanese Laid-Open Patent Publication No. Sho 59-75582
Patent Document 2: Japanese Laid-Open Patent Publication No. Hei 6-44954
Non-Patent Document 1: Super water-repellency and super water-repellent technology, published by Technical Information Institute Co. Ltd., p. 155-163

DISCLOSURE OF THE INVENTION

Problem to be Solved by the Invention

According to the proposal of Patent Document 1, oxygen can be expected to be selectively introduced into the cell. However, since a two-layer structure comprising the oxygen-selective permeable film and the oxygen permeable solution layer is used, the permeation of a gas is slowed. Accordingly, although the effect can be achieved during low rate discharging, it is difficult to secure the necessary amount of oxygen during high rate discharging, thus significantly degrading the discharge characteristics.

Further, the proposal of Patent Document 2 cannot be expected to achieve a great effect of inhibiting the permeation of water vapor, since the permeable pores are linear through holes and therefore the water repellency of the inner surface of the pores is insufficient.

Means for Solving the Problem

Therefore, as a result of keen examination on the relationship between the structure of a gas permeable film and the phenomenon of water vapor permeation, the inventors made the following findings. That is, the inventors found a phenomenon in which, when a gas permeable film is brought into a super water-repellent state (a state in which its contact angle with water is not less than 120° C.) by constituting it by predetermined particles, air permeates the gas permeable film, but the permeation of water vapor is suppressed.

Ordinarily, when air freely diffuses and passes through pores in the film, molecules in the air collide with the surface of the film and the inner walls of the pores in the film. Similarly, water vapor (water molecules) in the air diffuses, while colliding with the surface of the film and the inner walls of the pores in the film. However, when the film is in a super water-repellent state, water vapor receives a large repulsive force from the collided surface during collision with the film surface and the inner walls of the pores in the film, so that it cannot diffuse into (pass through) the pores. On the other hand, molecules other than water vapor in the air, such as oxygen and nitrogen, do not receive a large repulsive force when they collide with the film surface and the inner walls of the pores in the film, so that they can diffuse into (pass through) the pores.

Accordingly, when air is passed through a film having a contact angle with water of not less than 120° C., water vapor in the air is selectively removed, making it possible to obtain dry air.

Furthermore, the mean free path of freely diffusing molecules is about 100 nm (=0.1 μm). Accordingly, when the pore size in the film is not more than about 100 nm, water vapor in the air mostly collides with the inner walls of the pores in the film when passing through the film. Consequently, the effect of inhibiting the permeation of water vapor is increased. That is, when Knudsen diffusion is realized, the effect of inhibiting the permeation of water vapor is increased.

In view of the foregoing, the present invention proposes an oxygen permeable film comprising an aggregate of water-repellent particles. However, unlike the composite material of a binder and PTFE particles that is applied to the antenna surface without forming any void, as proposed in Non-Patent Document 1, the oxygen permeable film according to the present invention allows oxygen to permeate therethrough.

Specifically, voids suitable for oxygen to pass through are formed between the particles by setting the average particle size of the water-repellent particles to 0.01 to 50 μm. Since the oxygen permeable film of the present invention is constituted entirely or substantially entirely by the water-repellent particles, the surface of the film and the inner walls of the pores in the film have a large number of irregularities. Such irregularities improve the water repellency of the film, thus achieving a super water-repellent state in which the contact angle with water is not less than 120°. Accordingly, the permeation of water vapor is suppressed when the atmosphere passes through the oxygen permeable film of the present invention.

The oxygen permeable film of the present invention is produced by bonding particles having an average particle size of 0.01 to 50 μm and also having water-repellency by various methods. For example, an aggregate of particles that have been fused and integrated by heating or the like can be used as the oxygen permeable film. The physical properties of the film can be controlled by changing the kind of the particles constituting the film, the particle size, the method of bonding the particles, and the like.

As the water-repellent particles, it is preferable to use a fluorocarbon resin. As the fluorocarbon resin, at least one selected from the group consisting of polytetrafluoroethylene, polyvinyl fluoride and polyvinylidene fluoride is preferable.

It is preferable that the oxygen permeable film of the present invention has a specific surface area of not less than 0.1 m$^2$/g and not more than 500 m$^2$/g. Further, although the thickness of the oxygen permeable film is not particularly limited, it may be not less than 0.1 µm and not more than 1000 µm, for example.

The present invention also relates to an oxygen permeable sheet comprising the above-described oxygen permeable film and a porous substrate supporting it thereon, and to an oxygen permeable sheet having a three-layer structure that comprises the above-described oxygen permeable film and a pair of porous substrates sandwiching it therebetween. In the present invention, it is preferable that the oxygen permeable sheet has a Gurley number of not less than 0.5 seconds and not more than 50000 seconds.

As the material of the porous substrate, at least one selected from the group consisting of polyethylene, polypropylene, polytetrafluoroethylene, vinylon, polyphenylene sulfide (PPS), polybutylene terephthalate (PBT) and nylon is preferable.

It is preferable that the porous substrate has the form of a mesh, a nonwoven fabric or a microporous film. It is also possible to use a metal as the material of the porous substrate. That is, it is also possible to use a perforated metal foil and a metal mesh.

It is preferable that the aggregate of water-repellent particles has pores having a diameter of not more than 0.5 µm. For example, the ratio of the cumulative pore volume S1 in a diameter range of 0.01 µm to 0.5 µm and the cumulative pore volume S2 in a diameter range of 0.01 µm to 10 µm: S1/S2 is preferably not less than 0.01 and not more than 0.8, and more preferably not less than 0.02 and not more than 0.75.

Furthermore, in the oxygen permeable film having pores with a diameter of not more than 0.5 µm according to the present invention, the pore void fraction is preferably 20% to 90%.

The present invention further relates to an air cell including a positive electrode, a negative electrode, an electrolyte and an air intake mechanism for supplying air to the positive electrode, wherein the air intake mechanism includes the above-described oxygen permeable film or oxygen permeable sheet.

The present invention further relates to a fuel cell including a cathode, an anode, an electrolyte and an air intake mechanism for supplying air to the cathode, wherein the air intake mechanism includes the above-described oxygen permeable film or oxygen permeable sheet.

It should be noted that commonly available polytetrafluoroethylene (PTFE) porous films usually have few irregularities present on the surfaces thereof, and have a contact angle with water of not more than 110°, so that they can hardly achieve the effect of blocking water vapor.

Effect of the Invention

By using an oxygen permeable film comprising an aggregate of water-repellent particles and having an average particle size of the particles of 0.01 to 50 µm, it is possible to inhibit the permeation of water vapor from air, thereby obtaining more dry air. Use of such an oxygen permeable film for the air intake opening of an air cell or a fuel cell can suppress the entrance of water vapor into the cell, while introducing a relatively large amount of oxygen into the cell. Accordingly, for an air cell, it is possible to achieve favorable high rate discharge characteristics even after storing it in an opened state. Furthermore, for a fuel cell, it is possible to inhibit water blockage at the cathode, thereby expanding the allowable operation range.

Furthermore, in the case of using the oxygen permeable film of the present invention for elements and devices other than cells, the entrance of water vapor in air into the elements and the devices also can be inhibited. Accordingly, the elements and the devices can be provided with the function of preventing adverse effects that could be caused by water vapor. For example, in an apparatus for exchanging indoor air excluding water vapor with outdoor air, the indoor humidity can be maintained by exchanging indoor air with outdoor air through the oxygen permeable film of the present invention.

The present invention can also be applied to food-related fields. For example, when food is wrapped with the oxygen permeable sheet of the present invention, it is possible to inhibit the entrance of moisture in air into the food being preserved, thus improving the preservability.

BRIEF DESCRIPTION OF THE DRAWINGS

FIG. 2A is a front view, partly shown in cross section, of an AA-size air-zinc cell provided with an oxygen permeable sheet.

BEST MODE FOR CARRYING OUT THE INVENTION

Figure 1:
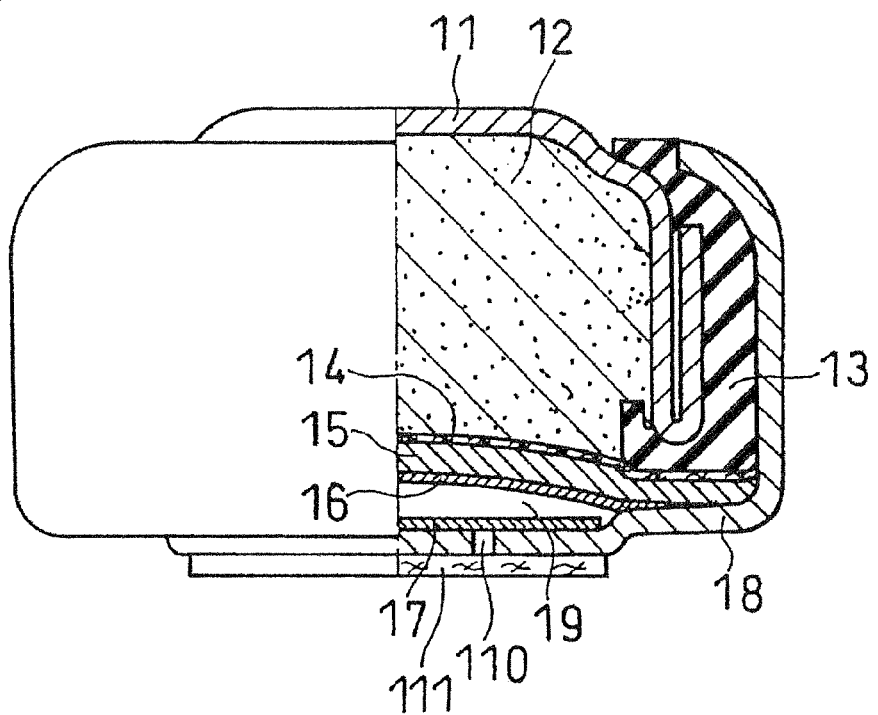
FIG. 1 is a front view, partly shown in cross section, of a coin-shaped air cell provided with an oxygen permeable sheet.

The oxygen permeable film of the present invention includes an aggregate of water-repellent particles, and the particles has an average particle size of 0.01 to 50 µm. Due to the shape of the particles, a large number of irregularities are formed on the surface of the film and the inner walls of the pores in the film, so that the film is in a water-repellent state. Furthermore, the interior of the oxygen permeable film is occupied by the particles whose surfaces have been partly bonded to each other by fusion or through a binder. Accordingly, the interior of the oxygen permeable film shows a fractal structure, and has a large number of voids.

When air is passed through these voids, only the entrance of water vapor is strongly inhibited, and the permeation of oxygen is promoted in comparison. Although oxygen and nitrogen that pass through the film diffuse into the film, while colliding with the surface of the film having water repellency and the inner walls of the pores in the film, only water vapor is restricted from diffusing since it receives a strong repulsive force from the film surface and the inner walls of the pores in the film. It should be noted that a film having a contact angle with water of not less than 120° is defined as being super water-repellent in the present invention.

When the oxygen permeable film of the present invention is disposed, for example, at the air intake channel of an air cell or a fuel cell, only water vapor contained in air is removed when the air passes through this film, and dry air is introduced into the cell. Accordingly, the introduction of oxygen can be promoted in comparison.

When the average particle size of the water-repellent particles is larger than 50 μm, the irregularities on the surface of the film and the inner walls of the pores in the film are decreased, so that the effect of repelling water vapor cannot be sufficiently achieved. On the other hand, when the average particle size of the water-repellent particles is smaller than 0.01 μm, the pore size in the film becomes considerably small, so that the permeation of oxygen is slowed, at the same time of achieving the effect of inhibiting the permeation of water vapor. Accordingly, it becomes difficult to secure the necessary amount of oxygen quickly.

From the foregoing, in the present invention, the average particle size of the water-repellent particles constituting the oxygen permeable film is limited to 0.01 μm to 50 μm. It should be noted that it is preferable to set the average particle size of the water-repellent particles to 0.1 μm to 15 μm, from the viewpoint of obtaining an oxygen permeable film that is well-balanced in the effect of repelling water vapor and the oxygen permeation speed. Furthermore, the contact angle between the film and water is preferably not less than 140°.

While the oxygen permeable film of the present invention may be in a state in which the particles constituting the film are bonded using a binder, it is more preferable to fuse the particles to each other by a heat treatment or the like, without using a binder. Fusion increases the film strength, thus making it possible to keep the water vapor permeation inhibiting effect for a longer time. Further, it is also possible to perform a further heat treatment for the oxygen permeable film in which bonding has been achieved with a binder, thereby fusing the particles to each other.

In the case of using a binder, although it is preferable to use, for example, a silicone-based resin as the binder, it is also possible to use a fluorocarbon resin such as polyvinylidene fluoride, besides this. The amount of the binder depends on the particle size of the water-repellent particles or the like, so that it cannot be specified unconditionally and is not particularly limited; however, the binder can be used in an amount of 2 to 20 parts by weight per 100 parts by weight of the water-repellent particles.

As the water-repellent particles, it is possible to use water-repellent compounds such as a silicone-based compound and a fluorine-based compound, without any particular limitation. However, it is preferable to use a fluorocarbon resin, because it is readily available, easy to handle and low cost. Examples of the fluorocarbon resin include polytetrafluoroethylene (PTFE), polytrifluorochloroethylene, polyvinyl fluoride, polyvinylidene fluoride, dichlorodifluoroethylene, polychlorotrifluoroethylene, a fluorinated ethylene-propylene copolymer, a perfluoroalkyl vinyl ether polymer, a perfluoroalkyl vinyl ester polymer and an ethylene-tetrafluoroethylene copolymer. Those having higher water repellency can provide a greater water vapor permeation inhibiting effect. Among them, polytetrafluoroethylene, polyvinyl fluoride and polyvinylidene fluoride are particularly preferable due to their particularly excellent water repellency.

As the water-repellent particles, it is also possible to use polyolefins such as polyethylene and polypropylene, polyvinyl chloride, polyvinylidene chloride, polyethylene terephthalate, polystyrene and the like.

The specific surface area of the oxygen permeable film of the present invention is preferably not less than 0.1 $m^2/g$ and not more than 500 $m^2/g$. When the specific surface area exceeds 500 $m^2/g$, the pore size in the film becomes considerably small, although the effect of inhibiting the permeation of water vapor is increased. Accordingly, the oxygen permeation speed is also reduced, so that it may be difficult to secure the necessary amount of oxygen quickly. Conversely, when the specific surface area is smaller than 0.1 $m^2/g$, the water vapor permeation inhibiting effect is reduced, although the oxygen permeation speed is increased. From the viewpoint of obtaining an oxygen permeable film that is well-balanced in the water vapor permeation inhibiting effect and the oxygen permeation speed, the specific surface area of the film is more preferably not less than 1 $m^2/g$ and not more than 100 $m^2/g$.

The thickness of the oxygen permeable film of the present invention is preferably not less than 0.1 μm and not more than 1000 μm. When the thickness of the film is larger than 1000 μm, the water vapor permeation inhibiting effect is increased since the distance a gas passes through the film increases; however, it may be difficult to secure the necessary amount of oxygen quickly. Conversely, when the thickness of the film is smaller than 0.1 μm, there is a tendency in which it is difficult to form a uniform film, although oxygen passes favorably. When the film is nonuniform, a density difference between the water-repellent particles is caused in the film, so that the degree of irregularities formed on the surface of the film and the inner walls of the pores in the film also becomes nonuniform. As a result, the water vapor permeation inhibiting effect may be reduced. From the viewpoint of obtaining a film having a high oxygen permeation speed and being uniform, the thickness of the film is particularly preferably not less than 5 μm and not more than 500 μm.

The oxygen permeable film of the present invention can also be used by being supported on a porous substrate serving as the support, or being sandwiched between a pair of porous substrates. It should be noted that a combination of a support and the oxygen permeable film is referred to as an oxygen permeable sheet in the present invention. In the case of an oxygen permeable sheet having a three-layer structure in which the oxygen permeable film is sandwiched between a pair of porous substrates, the oxygen permeable film is prevented from being damaged, so that it is possible to keep the water vapor permeation inhibiting effect for a long period of time.

The porous substrate is not particularly limited, as long as it has the capability of allowing a gas to pass therethrough and can support the oxygen permeable film thereon. However, it is preferable to use a porous substrate having a higher oxygen permeation speed than the oxygen permeable film of the present invention, in order not to unnecessarily restrict the movement of oxygen that has passed through the oxygen permeable film.

Examples of the material of the porous substrate include polytetrafluoroethylene (PTFE), polypropylene (PP), polyethylene (PE), vinylon, polyphenylene sulfide (PPS), polybutylene terephthalate (PBT), vinylon and nylon.

It is preferable that the porous substrate has the form of a mesh or a nonwoven fabric. The porous substrate may also have the form of a microporous film. Examples of the microporous film include a porous resin sheet or a film obtained by drawing it, a porous resin sheet containing fine particles of silica or the like or a sheet having a high porosity (void fraction) that is obtained by removing, from a resin sheet containing fine particles, the fine particles with a solvent or the like.

From the viewpoint of strengthening the bonding with the oxygen permeable film and increasing the strength of the film, it is also possible to use a metal substrate such as a perforated metal foil or a metal mesh as the porous substrate. In the case of using a metal substrate, the film strength can be relatively easily controlled by the thickness of the substrate, the degree of perforation, the porosity and the like.

The Gurley number of the oxygen permeable sheet comprising the oxygen permeable film of the present invention and the porous substrate is preferably not less than 0.5 seconds and not more than 50000 seconds. When the Gurley number is larger than 50000 seconds, it may be difficult to secure the necessary amount of oxygen quickly, although the water vapor permeation inhibiting effect is increased. On the other hand, when the Gurley number is smaller than 0.5 seconds, the thickness of the film needs to be reduced considerably, so that the water vapor permeation inhibiting effect tends to be nonuniform in the film. From the viewpoint of obtaining a film having a high oxygen permeation speed and being uniform, the Gurley number of the film is particularly preferably not less than 10 seconds and not more than 20000 seconds.

It is preferable that the aggregate of water-repellent particles has pores having a diameter of not more than 0.5 µm. The presence of minute pores increases the effect of inhibiting the permeation of water vapor even further. The size of the pore size of the oxygen permeable film can be controlled by changing the size of the water-repellent particles or the ratio of the water-repellent particles and the binder. Particularly, a skilled person would be able to readily control the size of the pore size by changing the ratio of the water-repellent particles and the binder.

Furthermore, the pore void fraction of the oxygen permeable film having pores with a diameter of not more than 0.5 µm and comprising the aggregate of water-repellent particles is more preferably 20% to 90%. When the pore void fraction is smaller than 20%, the air diffusion channel from the atmosphere into the cell, for example, in the air intake mechanism of the cell cannot be sufficiently secured. As a result, when the cell is subjected to high rate discharging, it becomes difficult to take in the necessary amount of oxygen from the atmosphere quickly, so that it may not be possible to achieve sufficient discharge characteristics. From the viewpoint of discharging the cell at a high rate, the pore void fraction is preferably not less than 20%.

Although it is preferable that all the pores have a diameter of not more than 0.5 µm from the viewpoint of ensuring a pore void fraction of not less than 20%, it is not necessary for all the pores to have a diameter of not more than 0.5 µm. If air passing through the film passes a pore having a diameter of not more than 0.5 µm even once, then it is possible to achieve a considerable water vapor permeation inhibiting effect.

When the pore void fraction is larger than 90%, it is difficult to maintain the strength of the film, and the proportion of the films that can be manufactured into a product may be therefore reduced to about 10 percent, although the rate characteristics and the water vapor permeation inhibiting effect of the cell are favorable. Therefore, the pore void fraction is preferably not more than 90%.

In the pore size distribution, the ratio of the cumulative pore volume $S1$ in a diameter range of 0.01 µm to 0.5 µm and the cumulative pore volume $S2$ in a diameter range of 0.01 µm to 10 µm: $S1/S2$ is preferably not less than 0.01 and not more than 0.8, and more preferably not less than 0.05 and not more than 0.8. The presence of minute pores having a diameter in the range of 0.01 µm to 0.5 µm improves the effect of inhibiting the permeation of water vapor even further.

When $S1/S2$ is not more than 0.01, the proportion of the minute pore present is small, so that the effect of inhibiting the permeation of water vapor may be insufficient. When $S1/S2$ is greater than 0.8, the proportion of the minute pores present increases, so that the overall void fraction of the oxygen permeable film may decrease, impeding the permeation of oxygen. Alternatively, the bonding force between the water-repellent particles may be reduced, making it easier for the particles to be detached.

The presence of pores having a diameter of not less than 10 µm reduces not only the effect of inhibiting the permeation of water vapor, but also the strength of the oxygen permeable film. Therefore, it is preferable that a pore having a diameter of not less than 10 µm is not present.

In order to improve the effect of inhibiting the permeation of water vapor even further, it is more preferable that the oxygen permeable film has a large number of pores having a diameter of not more than 0.1 µm, which can be expected to provide the effect of Knudsen diffusion. Increasing the proportion of the pores having a diameter of not more than 0.1 µm present greatly improves the effect of inhibiting the permeation of water vapor. Therefore, the ratio of the cumulative pore volume $S3$ in a diameter range of 0.01 µm to 0.1 µm to the cumulative pore volume $S2$ in a diameter range of 0.01 µm to 10 µm: $S3/S2$ is preferably not less than 0.01 and not more than 0.7, and more preferably not less than 0.02 and not more than 0.7.

When $S3/S2$ is larger than 0.7, the minute pores increase, so that the void fraction of the oxygen permeable film may be reduced, impeding the permeation of oxygen. Alternatively, the bonding force between the water-repellent particles may be reduced, making it easier for the particles to be detached.

Although examples of the method for measuring the pore size distribution and the pore void fraction of the oxygen permeable film include, but not limited to, mercury intrusion porosimetry, a nitrogen adsorption method and porosimetry. The principles of the measurement methods vary from each other, so that the results of the pore size distribution obtained may vary even for the same oxygen permeable film. However, the cumulative pore volume ratio, that is, the ratio of the total pore volume in a predetermined diameter range hardly varies even among different measurement methods.

It should be noted that mercury intrusion porosimetry and a nitrogen adsorption method can provide a pore size distribution that includes pores having various forms, including through holes and non-through holes. That is, the irregularities on the surface of the film also influence the pore size distribution, so that a distribution may be generated in a pore region larger than 1 µm. In mercury intrusion porosimetry and a nitrogen adsorption method, the maximum peak in a pore size distribution appears at substantially the same pore size position. However, in mercury intrusion porosimetry, there is the possibility that mercury may expand the pore size of the oxygen permeable film, so that the maximum peak also may appear at a slightly larger position than in a nitrogen adsorption method.

Porosimetry is a method for evaluating the through hole diameter of a porous material based on a bubble point method (ASTM F316-86, JIS K3832). This method provides a neck diameter distribution at the narrowest diameter area of a penetrating pore, that is, the neck portion. The penetration speed of a fluid such as a gas and a gaseous body changes depending on the size of the neck diameter of a through hole. The smaller the neck diameter is, the slower the permeation speed of the fluid is. Therefore, the neck diameter of a through hole is the most important factor for determining the permeability of a gas and a liquid.

There is the possibility that the pressure of mercury may expand the pore size in the stage of introducing mercury by pressure in mercury intrusion porosimetry, whereas there is less possibility that the pore size is changed in porosimetry since a gas or a liquid other than mercury is introduced by pressure. Accordingly, when the pore distributions of the same films produced by the same method are measured, there is a tendency in which the pore distribution obtained by porosimetry has a narrower distribution width and a narrower peak width than the pore distribution obtained by mercury intrusion porosimetry.

In addition, in mercury intrusion porosimetry and a nitrogen adsorption method, non-through holes are also the measuring objects, so that the irregularities on the film surface, that is, the surface roughness is also reflected in the distribution; however, only penetrating pores are the measuring objects in porosimetry. Therefore, there is a characteristic that the influence of the surface roughness does not appear in the pore distribution. Since the effect of inhibiting the permeation of water vapor is estimated to be the maximum at the neck portion of the through hole, porosimetry is most suitably used for measuring the pore distribution.

In the above-mentioned porosimetry, the absolute value of the volume cannot be measured. Therefore, it is preferable that the pore void fraction of the oxygen permeable film is estimated by mercury intrusion porosimetry and a nitrogen adsorption method. It should be noted that the void volume of the pores having a pore size of not less than 10 nm in the oxygen permeable film is measured by mercury intrusion porosimetry in this specification. Further, the void volume of the pores having a pore size of not more than 10 nm is measured using a nitrogen adsorption method. Then, the ratio of the sum of these pore void volumes to the volume (apparent volume) of the film is defined as a pore void fraction.

In the case of disposing the oxygen permeable film or the oxygen permeable sheet of the present invention between the air intake opening and the positive electrode of an air cell, the entrance of water vapor into the cell is inhibited when air is taken into the cell. Accordingly, even a cell that has been stored in an opened state can achieve excellent discharge characteristics.

In the case of disposing the oxygen permeable film or the oxygen permeable sheet of the present invention at the air supply channel to the cathode of a fuel cell, the entrance of water vapor into the cathode is inhibited when the air is taken into the fuel cell, inhibiting water blockage (flooding) at the cathode. Accordingly, the allowable operation range of the fuel cell is expanded.

EXAMPLES

Hereinafter, the present invention is specifically described by way of examples and comparative examples, but the invention is not limited to the following examples.

(1) Formation of Oxygen Permeable Films

Using the water-repellent particles listed in Tables 1A to 1G as the source materials, oxygen permeable films were formed on the porous substrates listed in Tables 1A to 1G by the following three types of film formation methods, and oxygen permeable sheets having predetermined forms were produced. The average particle sizes of the water-repellent particles used as the source materials, the Gurley numbers of the porous substrates and the thicknesses of the formed oxygen permeable films are shown in Tables 1A to 1G.

Film Formation Method 1 (Spray Process)

Predetermined water-repellent particles, a binder, n-heptane and toluene were mixed, and the resulting composition was placed in a spray can, together with a spray propellant (liquefied gas), and sprayed onto various porous substrates serving as the supports. The coatings formed on the substrates were dried for one hour at 80° C. in the atmosphere, thereby obtaining oxygen permeable films. The thicknesses of the oxygen permeable films were controlled by the spraying time.

Film Formation Method 2 (Application Process)

The water-repellent particles, a binder, n-heptane and toluene were mixed, and a thinner (a mixed solvent comprising isooctane and normal octane) was further added thereto as a diluent for viscosity adjustment, thus obtaining a composition. The resulting composition was applied onto various porous substrates serving as the supports into the required thicknesses, using an application machine such as a doctor blade. The coatings formed on the substrates were dried for one hour at 80° C. in the atmosphere, for example, thereby obtaining oxygen permeable films.

Film Formation Method 3 (Airless Spray Process)

Predetermined water-repellent particles, a binder, n-heptane and toluene were mixed, and the resulting composition was placed in a spray can for airless spraying, followed by compression by applying a pressure to the composition itself. Then, only the composition was ejected from a nozzle in a state in which no air was contained in the composition, without using a pressure by air, and sprayed onto various porous substrates serving as the supports. The coatings formed on the substrates were dried for one hour at 80° C. in the atmosphere, thereby obtaining oxygen permeable films. The thicknesses of the oxygen permeable films were controlled by the number of times of spraying, while repeating spraying intermittently. In the airless spray process, the precision is more improved by adjusting the thickness of the coating by the number of times of spraying than by the spraying time.

TABLE 1A

| Sample No. | Form of film | Kind of water-repellent particles (resin) | Surface area ($m^2/g$) | Average particle size (µm) | Film thickness (µm) | Gurley number (s) | Contact angle with water (°) |
|---|---|---|---|---|---|---|---|
| A1 | aggregate of particles | polytetrafluoroethylene | 0.05 | 70 | 150 | 550 | 130 |
| A2 | aggregate of particles | polytetrafluoroethylene | 0.09 | 70 | 150 | 600 | 130 |
| A3 | aggregate of particles | polytetrafluoroethylene | 0.1 | 50 | 150 | 660 | 130 |
| A4 | aggregate of particles | vinyl fluoride | 0.5 | 15 | 150 | 700 | 140 |
| A5 | aggregate of particles | vinylidene fluoride | 1 | 10 | 150 | 750 | 140 |

TABLE 1A-continued

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| A6 | aggregate of particles | polytetrafluoroethylene and vinyl fluoride | 2 | 1 | 150 | 770 | 140 |
| A7 | aggregate of particles | polytetrafluoroethylene, vinyl fluoride and vinylidene fluoride | 5 | 0.5 | 150 | 780 | 150 |
| A8 | aggregate of particles | polytetrafluoroethylene | 10 | 0.1 | 150 | 810 | 160 |
| A9 | aggregate of particles | vinyl fluoride | 100 | 0.03 | 150 | 850 | 120 |
| A10 | aggregate of particles | vinylidene fluoride | 200 | 0.025 | 150 | 880 | 130 |
| A11 | aggregate of particles | polytetrafluoroethylene and vinyl fluoride | 300 | 0.02 | 150 | 890 | 130 |
| A12 | aggregate of particles | polytetrafluoroethylene, vinyl fluoride and vinylidene fluoride | 400 | 0.015 | 150 | 880 | 130 |
| A13 | aggregate of particles | polytetrafluoroethylene | 500 | 0.01 | 150 | 940 | 130 |
| A14 | aggregate of particles | polytetrafluoroethylene | 600 | 0.009 | 150 | 950 | 120 |
| A15 | aggregate of particles | polytetrafluoroethylene | 700 | 0.009 | 150 | 1000 | 120 |
| A16 | porous film | polytetrafluoroethylene | — | — | 100 | 500 | 110 |
| A17 | porous film | polytetrafluoroethylene | — | — | 100 | 10000 | 110 |
| A18 | porous film | vinyl fluoride | — | — | 100 | 2500 | 100 |
| A19 | porous film | vinylidene fluoride | — | — | 100 | 14000 | 90 |

TABLE 1B

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| B1 | particles partly fused together | polytetrafluoroethylene | 0.2 | 30 | 150 | 600 | 160 |
| B2 | particles partly fused together | polytetrafluoroethylene | 0.5 | 10 | 150 | 810 | 160 |
| B3 | particles partly fused together | vinyl fluoride | 2 | 1 | 150 | 850 | 120 |
| B4 | particles partly fused together | vinylidene fluoride | 4 | 0.5 | 150 | 880 | 130 |
| B5 | particles partly fused together | vinyl fluoride | 7 | 0.2 | 150 | 890 | 140 |
| B6 | particles partly fused together | vinylidene fluoride | 10 | 0.1 | 150 | 880 | 150 |
| B7 | particles partly fused together | polytetrafluoroethylene | 400 | 0.02 | 150 | 1000 | 160 |
| C1 | aggregate of particles | polytetrafluoroethylene | 2.5 | 1 | 10 | 550 | 160 |
| C2 | aggregate of particles | polytetrafluoroethylene | 2.6 | 1.1 | 10 | 10500 | 160 |
| C3 | aggregate of particles | vinyl fluoride | 2.55 | 1.2 | 10 | 3000 | 120 |
| C4 | aggregate of particles | vinylidene fluoride | 2.7 | 1 | 10 | 15000 | 130 |
| C5 | aggregate of particles | polytetrafluoroethylene and vinyl fluoride | 2.5 | 1 | 10 | 550 | 140 |
| C6 | aggregate of particles | polytetrafluoroethylene, vinyl fluoride and vinylidene fluoride | 2.6 | 1 | 10 | 550 | 150 |
| C7 | aggregate of particles | dimethyl polysiloxane | 2 | 1 | 10 | 600 | 120 |

TABLE 1C

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| D1 | aggregate of particles | polytetrafluoroethylene | 0.05 | 70 | 150 | 550 | 160 |
| D2 | particles partly fused together | polytetrafluoroethylene | 0.09 | 70 | 150 | 600 | 160 |
| D3 | aggregate of particles | polytetrafluoroethylene | 0.1 | 50 | 150 | 660 | 160 |
| D4 | aggregate of particles | vinyl fluoride | 0.5 | 15 | 150 | 700 | 120 |
| D5 | aggregate of particles | vinylidene fluoride | 1 | 3 | 150 | 750 | 130 |
| D6 | aggregate of particles | polytetrafluoroethylene and vinyl fluoride | 2 | 1 | 150 | 770 | 140 |
| D7 | aggregate of particles | polytetrafluoroethylene, vinyl fluoride and vinylidene fluoride | 5 | 0.5 | 150 | 780 | 150 |
| D8 | particles partly fused together | polytetrafluoroethylene | 10 | 0.1 | 150 | 810 | 160 |
| D9 | particles partly fused together | vinyl fluoride | 100 | 0.03 | 150 | 850 | 120 |
| D10 | particles partly fused together | vinylidene fluoride | 200 | 0.025 | 150 | 880 | 130 |
| D11 | particles partly fused together | polytetrafluoroethylene and vinyl fluoride | 300 | 0.02 | 150 | 890 | 140 |
| D12 | particles partly fused together | polytetrafluoroethylene, vinyl fluoride and vinylidene fluoride | 400 | 0.015 | 150 | 880 | 150 |
| D13 | aggregate of particles | polytetrafluoroethylene | 500 | 0.01 | 150 | 940 | 160 |
| D14 | aggregate of particles | polytetrafluoroethylene | 600 | 0.009 | 150 | 950 | 160 |
| D15 | particles partly fused together | polytetrafluoroethylene | 700 | 0.009 | 150 | 1000 | 160 |

TABLE 1D

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| E1 | aggregate of particles | polytetrafluoroethylene | 200 | 0.03 | 0.08 | 0.3 | 160 |
| E2 | particles partly fused together | polytetrafluoroethylene | 220 | 0.03 | 0.09 | 0.4 | 160 |
| E3 | aggregate of particles | polytetrafluoroethylene | 230 | 0.03 | 0.1 | 1 | 160 |
| E4 | aggregate of particles | polytetrafluoroethylene | 8 | 0.2 | 1 | 8 | 160 |
| E5 | aggregate of particles | polytetrafluoroethylene | 10 | 0.3 | 5 | 10 | 160 |
| E6 | aggregate of particles | polytetrafluoroethylene | 10 | 0.3 | 10 | 500 | 160 |
| E7 | aggregate of particles | polytetrafluoroethylene | 12 | 0.3 | 50 | 2000 | 160 |
| E8 | aggregate of particles | polytetrafluoroethylene | 15 | 0.2 | 100 | 10000 | 160 |
| E9 | particles partly fused together | polytetrafluoroethylene | 6 | 0.5 | 500 | 20000 | 160 |
| E10 | particles partly fused together | polytetrafluoroethylene | 7 | 0.5 | 600 | 30000 | 160 |
| E11 | particles partly fused together | polytetrafluoroethylene | 8 | 0.5 | 800 | 40000 | 160 |
| E12 | aggregate of particles | polytetrafluoroethylene | 15 | 0.2 | 1000 | 50000 | 160 |
| E13 | aggregate of particles | polytetrafluoroethylene | 11 | 0.3 | 1200 | 60000 | 160 |
| E14 | particles partly fused together | polytetrafluoroethylene | 10 | 0.3 | 1400 | 70000 | 160 |

TABLE 1E

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| F1 | aggregate of particles | polytetrafluoroethylene | 12 | 0.3 | 2 | 0.5 | 160 |
| F2 | particles partly fused together | polytetrafluoroethylene | 4 | 0.2 | 1 | 1 | 160 |
| F3 | aggregate of particles | polytetrafluoroethylene | 13 | 0.3 | 3 | 5 | 160 |
| F4 | aggregate of particles | polytetrafluoroethylene | 12 | 0.3 | 5 | 10 | 160 |
| F5 | aggregate of particles | vinyl fluoride | 11 | 0.3 | 4 | 40 | 120 |
| F6 | particles partly fused together | vinylidene fluoride | 5 | 0.2 | 10 | 100 | 130 |
| F7 | aggregate of particles | polytetrafluoroethylene | 10 | 0.4 | 14 | 300 | 160 |
| F8 | aggregate of particles | polytetrafluoroethylene | 11 | 0.3 | 20 | 1000 | 160 |
| F9 | aggregate of particles | polytetrafluoroethylene | 13 | 0.2 | 65 | 5000 | 160 |
| F10 | particles partly fused together | polytetrafluoroethylene | 12 | 0.3 | 32 | 8000 | 160 |
| F11 | particles partly fused together | polytetrafluoroethylene | 10 | 0.2 | 70 | 10000 | 160 |
| F12 | aggregate of particles | vinyl fluoride | 9 | 0.4 | 80 | 20000 | 120 |
| F13 | aggregate of particles | vinylidene fluoride | 10 | 0.2 | 130 | 50000 | 130 |

TABLE 1F

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| G1 | aggregate of particles | polytetrafluoroethylene | 13 | 0.3 | 12 | 300 | 160 |
| G2 | aggregate of particles | polytetrafluoroethylene | 15 | 0.2 | 13 | 350 | 160 |
| G3 | aggregate of particles | polytetrafluoroethylene | 12 | 0.3 | 14 | 400 | 160 |
| G4 | particles partly fused together | polytetrafluoroethylene | 7 | 0.4 | 15 | 500 | 160 |
| G5 | aggregate of particles | vinyl fluoride | 13 | 0.3 | 18 | 450 | 120 |
| G6 | aggregate of particles | vinylidene fluoride | 10 | 0.4 | 13 | 300 | 130 |
| G7 | aggregate of particles | polytetrafluoroethylene | 11 | 0.5 | 12 | 350 | 160 |
| G8 | aggregate of particles | polytetrafluoroethylene | 14 | 0.3 | 19 | 500 | 160 |
| G9 | aggregate of particles | polytetrafluoroethylene | 12 | 0.4 | 20 | 450 | 160 |
| G10 | aggregate of particles | polytetrafluoroethylene | 13 | 0.3 | 20 | 300 | 160 |
| G11 | aggregate of particles | polytetrafluoroethylene | 15 | 0.2 | 23 | 330 | 160 |
| G12 | aggregate of particles | polytetrafluoroethylene | 12 | 0.3 | 24 | 470 | 160 |
| G13 | particles partly fused together | polytetrafluoroethylene | 7 | 0.4 | 25 | 550 | 160 |
| G14 | aggregate of particles | vinyl fluoride | 13 | 0.3 | 28 | 500 | 120 |
| G15 | aggregate of particles | vinylidene fluoride | 10 | 0.4 | 13 | 300 | 130 |
| G16 | aggregate of particles | Polytetrafluoroethylene | 11 | 0.5 | 12 | 450 | 160 |
| G17 | aggregate of particles | Polytetrafluoroethylene | 14 | 0.3 | 29 | 300 | 160 |
| H1 | aggregate of particles | Polytetrafluoroethylene | 1.3 | 1 | 32 | 100 | 160 |
| H2 | aggregate of particles | Polytetrafluoroethylene | 1.2 | 1 | 50 | 50 | 160 |
| H3 | aggregate of particles | Polytetrafluoroethylene | 1.1 | 1 | 40 | 60 | 160 |

TABLE 1F-continued

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| H4 | aggregate of particles | Polytetrafluoroethylene | 1.3 | 1 | 30 | 40 | 160 |
| H5 | particles partly fused together | Polytetrafluoroethylene | 1 | 1 | 40 | 30 | 160 |
| H6 | aggregate of particles | vinyl fluoride | 1.1 | 1 | 20 | 12 | 120 |
| H7 | aggregate of particles | vinylidene fluoride | 1.2 | 1 | 10 | 8 | 130 |

TABLE 1G

| Sample No. | Form of film | Kind of water-repellent particles (resin) | Surface area (m²/g) | Average particle size (μm) | Film thickness (μm) | Gurley number (s) | Contact angle with water (°) |
|---|---|---|---|---|---|---|---|
| I1 | aggregate of particles | polytetrafluoroethylene | 0.6 | 1 | 120 | 600 | 160 |
| I2 | aggregate of particles | polytetrafluoroethylene | 1.8 | 1 | 121 | 600 | 160 |
| I3 | aggregate of particles | polytetrafluoroethylene | 8 | 1 | 122 | 590 | 160 |
| I4 | aggregate of particles | polytetrafluoroethylene | 44 | 1 | 119 | 580 | 160 |
| I5 | aggregate of particles | polytetrafluoroethylene | 88 | 1 | 123 | 550 | 160 |
| I6 | aggregate of particles | polytetrafluoroethylene | 102 | 1 | 121 | 600 | 160 |
| I7 | aggregate of particles | polytetrafluoroethylene | 0.7 | 0.8 | 120 | 600 | 160 |
| I8 | aggregate of particles | polytetrafluoroethylene | 2.1 | 0.8 | 120 | 590 | 160 |
| I9 | aggregate of particles | polytetrafluoroethylene | 9.5 | 0.8 | 120 | 580 | 160 |
| I10 | aggregate of particles | polytetrafluoroethylene | 53 | 0.8 | 120 | 570 | 160 |
| I11 | aggregate of particles | polytetrafluoroethylene | 107 | 0.8 | 120 | 580 | 160 |
| I12 | aggregate of particles | polytetrafluoroethylene | 107 | 0.8 | 120 | 570 | 160 |

Specifically, the oxygen permeable sheets were produced in the following manner.

Example 1

Oxygen Permeable Sheets A1 to A15

Oxygen permeable films comprising the water-repellent particles (average particle size: 0.009 μm to 70 μm) listed in Table 1A were formed on porous substrates having different Gurley numbers by the above-described predetermined film formation methods.

(i) Production of A1

A porous film (manufactured by Japan Gore-Tex Inc.: part number GF52) having a Gurley number of 500 seconds and comprising polytetrafluoroethylene was used as the porous substrate. Particles comprising polytetrafluoroethylene having an average particle size of 70 μm (particles A1) were used as the water-repellent particles. An oxygen permeable sheet was produced by the film formation method 1 (spray process). The content of the spray can was sprayed for two seconds onto the porous substrate from a position about 30 cm away from the porous substrate.

The content filled into the spray can had a composition comprising 40 wt % of n-heptane, 5 wt % of toluene, 35 wt % of liquefied gas (LPG), 10 wt % of the particles A1 and 10 wt % of a silicone resin (dimethyl polysiloxane) as the binder.

(ii) Production of A2

A porous film having a Gurley number of 500 seconds and comprising polyethylene (manufactured by Asahi Kasei Corporation) was used as the porous substrate. Particles comprising polytetrafluoroethylene having an average particle size of 70 μm (particles A2) were used as the water-repellent particles. An oxygen permeable sheet was produced by the film formation method 2 (application process).

The composition used for the application comprised 63 wt % of n-heptane, 8 wt % of toluene, 16 wt % of the particles A2 and 13 wt % of the silicone resin as the binder. This composition was diluted with a thinner (comprising not less than 98% of isooctane and less than 2% of normal octane) having a weight twice the weight thereof, and thereafter applied onto the porous substrate using a doctor blade such that the thickness of the film was 10 μm.

(iii) Production of A3 to A9

Oxygen permeable sheets A3 to A9 were produced using the water-repellent particles listed in Table 1A by the film formation method 1 (spray process), following the procedure used for the oxygen permeable sheet A1.

It should be noted that the weight ratio of the water-repellent particles in A6 was set such that polytetrafluoroethylene: vinyl fluoride=80:20, and the weight ratio of the water-repellent particles in A7 was set such that polytetrafluoroethylene: vinyl fluoride:vinylidene fluoride=80:10:10.

The following were used as the porous substrates.
A3: a porous film comprising polypropylene
A4: a porous film comprising vinylon
A5: a porous film comprising polyphenylene sulfide
A6: a porous film comprising polybutylene terephthalate
A7: a porous film comprising nylon
A8: a porous film comprising polytetrafluoroethylene
A9: a porous film comprising polytetrafluoroethylene
(iv) Production of A10 to A15

Oxygen permeable sheets A10 to A15 were produced using the water-repellent particles listed in Table 1A and the porous substrates by the film formation method 2 (application process), following the procedure used for the oxygen permeable sheet A2.

It should be noted that the weight ratio of the water-repellent particles in A11 was set such that polytetrafluoroethylene:vinyl fluoride=80:20, and the weight ratio of the water-repellent particles in A12 was set such that polytetrafluoroethylene:vinyl fluoride:vinylidene fluoride=80:10:10.

The following were used as the porous substrates.
A10: a porous film comprising polyethylene
A11: a porous film comprising polypropylene
A12: a porous film comprising vinylon
A13: a porous film comprising polyphenylene sulfide
A14: a porous film comprising polybutylene terephthalate
A15: a porous film comprising nylon Oxygen Permeable Sheets A16 to A19

Commercially available porous films comprising the water-repellent resins listed in Table 1A were directly used as oxygen permeable sheets A16 to A19. The Gurley numbers and the thicknesses of these porous films are also shown in Table 1A.

Example 2

Production of Oxygen Permeable Sheets B1 to B7

Coatings were formed using the water-repellent particles listed in Table 1B by the film formation method 1 (spray process), following the procedure used for the oxygen permeable sheet A1, and thereafter annealing was performed for about 10 minutes in the atmosphere. Consequently, oxygen permeable sheets B1 to B7 having an oxygen permeable film in which the particles being in point contact with one another were fused together were obtained. By fusing the particles together while they are in point contact in this manner, the persistence of the water vapor permeation inhibiting effect is increased, thus improving the oxygen permeability. However, when the particles are melted excessively, there will be no irregularities on the surface of the film comprising an aggregate of the particles and the inner walls of the pores in the film, decreasing the water repellency of the film.

The annealing temperature was set to 250° C. to 310° C. when polytetrafluoroethylene was used as the water-repellent particles, and, when other resins were used, it was set to a temperature about 10° C. to 60° C. lower than the melting point of each of the resins.

The following were used as the porous substrates.
B1: a porous film comprising polytetrafluoroethylene
B2: a porous film comprising polyethylene
B3: a porous film comprising polypropylene
B4: a porous film comprising vinylon
B5: a porous film comprising polyphenylene sulfide
B6: a porous film comprising polybutylene terephthalate
B7: a porous film comprising nylon Example 3

Production of Oxygen Permeable Sheets C1 to C7

Oxygen permeable sheets C1 to C7 were produced using the water-repellent particles listed in Table 1B by the film formation method 1 (spray process), following the procedure used for the oxygen permeable sheet A1.

It should be noted that the weight ratio of the water-repellent particles in C5 was set such that polytetrafluoroethylene:vinyl fluoride=80:20, and the weight ratio of the water-repellent particles in C6 was set such that polytetrafluoroethylene:vinyl fluoride:vinylidene fluoride=80:10:10.

The following were used as the porous substrates.
C1: a porous film comprising polytetrafluoroethylene
C2: a porous film comprising polyethylene
C3: a porous film comprising polypropylene
C4: a porous film comprising vinylon
C5: a porous film comprising polyphenylene sulfide
C6: a porous film comprising polybutylene terephthalate
C7: a porous film comprising nylon Example 4

Production of Oxygen Permeable Sheets D1 to D15

From the viewpoint of examining the relationship between the specific surface area and the water vapor permeation inhibiting effect of the oxygen permeable film, oxygen permeable films having different specific surface areas were produced. The specific surface areas of the oxygen permeable films were controlled by varying the average particle size of the water-repellent particles and changing the film formation method.
(i) Production of D1, D3 to D7 and D13 to D14

Oxygen permeable sheets D1, D3 to D7 and D13 to D14 were produced using the water-repellent particles listed in Table 1C by the film formation method 1 (spray process), following the procedure used for the oxygen permeable sheet A1.
(ii) Production of D2, D8 to D12 and D15

Oxygen permeable sheets D2, D8 to D12 and D15 were produced using the water-repellent particles listed in Table 1C by the film formation method 1 (spray process), following the procedure used for the oxygen permeable sheet B1 (Example 2).

It should be noted that the weight ratio of the water-repellent particles in D6 and D11 was set such that polytetrafluoroethylene:vinyl fluoride=80:20, and the weight ratio of the water-repellent particles in D7 and D12 was set such that polytetrafluoroethylene:vinyl fluoride:vinylidene fluoride=80:10:10.

The following were used as the porous substrates.
D1: a porous film comprising polytetrafluoroethylene
D2: a porous film comprising polytetrafluoroethylene
D3: a porous film comprising polypropylene
D4: a porous film comprising vinylon
D5: a porous film comprising polyphenylene sulfide
D6: a porous film comprising polybutylene terephthalate
D7: a porous film comprising nylon
D8: a porous film comprising polytetrafluoroethylene
D9: a porous film comprising polytetrafluoroethylene
D10: a porous film comprising polytetrafluoroethylene
D11: a porous film comprising polytetrafluoroethylene D12: a porous film comprising polytetrafluoroethylene
D13: a porous film comprising polyphenylene sulfide
D14: a porous film comprising polybutylene terephthalate
D15: a porous film comprising polytetrafluoroethylene Example 5

Production of Oxygen Permeable Sheets E1 to E14

From the viewpoint of examining the relationship between the thickness and the water vapor permeation inhibiting effect of the oxygen permeable film, oxygen permeable films having different thicknesses were produced. The thicknesses of the oxygen permeable films were controlled by varying the average particle size of the water-repellent particles (polytetrafluoroethylene was used uniformly) within the range of 0.03 μm to 0.5 μm and changing the film formation method.
(i) Production of E1, E3 to E8 and E12 to E13

Oxygen permeable sheets E1, E3 to E8 and E12 to E13 were produced using the water-repellent particles listed in Table 1D by the film formation method 2 (application process) following the procedure used for the oxygen permeable sheet A2.
(ii) Production of E2, E9 to E11 and E14

Coatings were formed using the water-repellent particles listed in Table 1D by the film formation method 2 (application process), following the procedure used for the oxygen permeable sheet A2, and thereafter annealing was performed for about 10 minutes in the atmosphere. Consequently, oxygen permeable sheets E2, E9 to E11 and E14 having an oxygen permeable film in which the particles being in point contact with one another were fused together were obtained. It should be noted that, since polytetrafluoroethylene was used as the water-repellent particles, the annealing temperature was set to 250° C. to 310° C.

In addition, the following were used as the porous substrates.

E1: a porous film comprising polytetrafluoroethylene
E2: a porous film comprising polytetrafluoroethylene
E3: a porous film comprising polyethylene
E4: a porous film comprising polypropylene
E5: a porous film comprising vinylon
E6: a porous film comprising polyphenylene sulfide
E7: a porous film comprising polybutylene terephthalate
E8: a porous film comprising nylon
E9: a porous film comprising polytetrafluoroethylene
E10: a porous film comprising polytetrafluoroethylene
E11: a porous film comprising polytetrafluoroethylene
E12: a porous film comprising polytetrafluoroethylene
E13: a porous film comprising polytetrafluoroethylene
E14: a porous film comprising polytetrafluoroethylene Example 6

Production of Oxygen Permeable Sheets F1 to F13

After forming predetermined oxygen permeable films on the porous substrates (for supporting), each of the films was sandwiched using another porous substrate (for protection) in order to protect that film, thus producing an oxygen permeable sheet having a three-layer structure. It should be noted that "contact angles with water" shown in Table 1B was measured for the surface of each of the films before they were sandwiched using another porous substrate.
(i) Production of F1, F3 to F5, F7 to F9 and F12 to 13

Oxygen permeable films were produced using the water-repellent particles listed in Table 1E by the film formation method 2 (application process), following the procedure used for the oxygen permeable sheet A2. Thereafter, another porous substrate was disposed on each of the formed oxygen permeable films, thus obtaining oxygen permeable sheets F1, F3 to F5, F7 to F9 and F12 to 13 having a three-layer structure. The integration of the three layers was carried out by placing another porous substrate on each of the dried oxygen permeable films, and then joining the edge portions having a width of about 1 mm by thermal welding.
(ii) Production of F2, F6 and F10 to F11

Coatings were formed using the water-repellent particles listed in Table 1E by the film formation method 2 (application process), following the procedure used for the oxygen permeable sheet A2, and thereafter annealing was performed for about 10 minutes in the atmosphere. Consequently, oxygen permeable films in which the particles being in point contact with one another were fused together were formed. Thereafter, another porous substrate was disposed on each of the formed oxygen permeable films, thus obtaining oxygen permeable sheets F2, F6 and F10 to F11 having a three-layer structure. It should be noted that, since polytetrafluoroethylene was used as the water-repellent particles, the annealing temperature was set to 250° C. to 310° C.

The following were used as the porous substrates.

F1: a porous film (for supporting) comprising polytetrafluoroethylene, and a porous film (for protection) comprising polytetrafluoroethylene F2: a porous film (for supporting) comprising polyethylene, and a porous film (for protection) comprising polyethylene F3: a porous film (for supporting) comprising polypropylene, and a porous film (for protection) comprising polypropylene F4: a porous film (for supporting) comprising polytetrafluoroethylene, and a porous film (for protection) comprising polyethylene F5: a porous film (for supporting) comprising polytetrafluoroethylene, and a porous film (for protection) comprising polytetrafluoroethylene F6: a porous film (for supporting) comprising polytetrafluoroethylene, and a porous film (for protection) comprising polytetrafluoroethylene F7: a porous film (for supporting) comprising vinylon, and a porous film (for protection) comprising vinylon F8: a porous film (for supporting) comprising polyphenylene sulfide, and a porous film (for protection) comprising polyphenylene sulfide F9: a porous film (for supporting) comprising polybutylene terephthalate, and a porous film (for protection) comprising polybutylene terephthalate F10: a porous film (for supporting) comprising nylon, and a porous film (for protection) comprising nylon F11: a porous film (for supporting) comprising polyphenylene sulfide, and a porous film (for protection) comprising nylon F12: a porous film (for supporting) comprising polybutylene terephthalate, and a porous film (for protection) comprising nylon F13: a porous film (for supporting) comprising vinylon, and a porous film (for protection) comprising nylon

Example 7

Production of Oxygen Permeable Sheets G1 to G17

Various porous substrates were used as the supports.
(i) Production of G1 to G3 and G5 to G9

Oxygen permeable sheets G1 to G3 and G5 to G9 were produced using the water-repellent particles listed in Table 1B by the film formation method 1 (spray process), following the procedure used for the oxygen permeable sheet A1.
(ii) Production of G4

A coating was formed using the water-repellent particles listed in Table 1F by the film formation method 1 (spray process), following the procedure used for the oxygen permeable sheet A1, and thereafter annealing was performed for about 10 minutes in the atmosphere. Consequently, an oxygen permeable sheet G4 having an oxygen permeable film in which the particles being in point contact with one another were fused together was obtained. It should be noted that, since polytetrafluoroethylene was used as the water-repellent particles, the annealing temperature was set to 250° C. to 310° C.
(iii) Production of G10 to 12 and G14 to 17

Oxygen permeable films were formed using the water-repellent particles listed in Table 1F by the film formation method 1 (spray process), following the procedure used for the oxygen permeable sheet A1. Thereafter, another porous substrate was disposed on each of the formed oxygen permeable films, thus obtaining oxygen permeable sheets G10 to 12 and G14 to 17 having a three-layer structure.
(iv) Production of G13

A coating was formed using the water-repellent particles listed in Table 1F by the film formation method 1 (spray process), following the procedure used for the oxygen permeable sheet A1, and thereafter annealing was performed for about 10 minutes in the atmosphere. Consequently, an oxygen permeable film in which the particles being in point contact with one another were fused together was formed. Thereafter, another porous substrate was disposed on the formed oxygen permeable film, thus obtaining an oxygen permeable sheet G13 having a three-layer structure. It should be noted that, since polytetrafluoroethylene was used as the water-repellent particles, the annealing temperature was set to 250° C. to 310° C.

The following were used as the porous substrates.
G1: a porous film comprising polyethylene
G2: a porous film comprising polypropylene
G3: a nonwoven fabric comprising polytetrafluoroethylene
G4: a nonwoven fabric comprising polytetrafluoroethylene
G5: a nonwoven fabric comprising vinylon
G6: a mesh comprising polyphenylene sulfide
G7: a mesh comprising polybutylene terephthalate
G8: a nonwoven fabric comprising nylon
G9: a mesh comprising nylon
G10: a porous film (for supporting) comprising polytetrafluoroethylene, and a porous film (for protection) comprising polytetrafluoroethylene
G11: a porous film (for supporting) comprising polyethylene, and a nonwoven fabric (for protection) comprising polyethylene
G12: a porous film (for supporting) comprising polypropylene, and a nonwoven fabric (for protection) comprising polypropylene
G13: a porous film (for supporting) comprising polytetrafluoroethylene, and a mesh (for protection) comprising nylon
G14: a nonwoven fabric (for supporting) comprising polyphenylene sulfide, and a mesh (for protection) comprising nylon
G15: a nonwoven fabric (for supporting) comprising polybutylene terephthalate, a mesh (for protection) comprising nylon
G16: a porous film (for supporting) comprising vinylon, and a nonwoven fabric (for protection) comprising vinylon
G17: a porous film (for supporting) comprising polytetrafluoroethylene, and a mesh (for protection) comprising nylon

Example 8

Production of Oxygen Permeable Sheets H1 to H7

Porous substrates comprising various metals were used as the supports.
(i) Production of H1 to H4 and H6 to H7

Oxygen permeable sheets H1 to H4 and H6 to H7 were produced using the water-repellent particles listed in Table 1F by the film formation method 1 (spray process), following the procedure used for the oxygen permeable sheet A1.
(ii) Production of H5

A coating was formed using the water-repellent particles listed in Table 1F by the film formation method 1 (spray process), following the procedure used for the oxygen permeable sheet A1, and thereafter annealing was performed for about 10 minutes in the atmosphere. Consequently, an oxygen permeable sheet H5 having an oxygen permeable film in which the particles being in point contact with one another were fused together was obtained. It should be noted that, since polytetrafluoroethylene was used as the water-repellent particles, the annealing temperature was set to 250° C. to 310° C.

The following were used as the porous substrates comprising metals.

H1: a porous copper foil (a perforated copper foil), manufactured by KUSHIBE CO., LTD., having a thickness of 18 μm, a hole diameter of φ0.3 mm, a pitch (the space between holes) of 0.404 mm, and a porosity of 50%

H2: a copper mesh foil manufactured by KUSHIBE CO., LTD., having a pore size of 75 μm×75 μm that had been obtained by braiding a copper wire having a diameter of φ0.2 mm into a grid configuration H3: an SUS (stainless steel) mesh foil having the same form as that of H2

H4: a porous nickel foil having the same form as that of H1

H5: a porous aluminum foil having the same form as that of H1

H6: an aluminum mesh foil having the same form as that of H2

H7: a brass mesh foil having the same form as that of H2

Example 9

Production of Oxygen Permeable Sheets I1 to I10

(i) Production of I1

A porous film (manufactured by Japan Gore-Tex Inc.: part number GF41) having a Gurley number of 450 seconds and comprising polytetrafluoroethylene was used as the porous substrate. Particles I1 comprising polytetrafluoroethylene having an average particle size of 1 μm were used as the water-repellent particles. An oxygen permeable sheet I1 was produced by the film formation method 3 (airless spray process). The content of the spray can was sprayed over about one second onto a porous substrate having a length of 30 cm from a position about 50 cm away from the porous substrate. The spraying was performed three times.

The content filled into the spray can had a composition comprising 40 wt % of n-heptane, 10 wt % of toluene, 10 wt % of the particles I1 and 40 wt % of a silicone resin (dimethyl polysiloxane) as the binder.

Here, by setting the weight ratio of the particles I1 and the binder during drying and solidification of the coating to 20:80, the ratio of the cumulative pore volume S1 in a diameter range of 0.01 to 0.5 μm and the cumulative pore volume S2 in a diameter range of 0.01 to 10 μm: S1/S2 was controlled to 0.01.

(ii) Production of I2 to I6

Oxygen permeable sheets I2 to I6 were produced by the film formation method 3 (airless spray process), following the procedure used for the oxygen permeable sheet I1, except that S1/S2 was changed to 0.05, 0.15, 0.5, 0.8 or 1, respectively, by setting the weight ratio of the particles I1 and the binder during drying and solidification to 40:60, 60:40, 70:30, 80:20 or 95:5, respectively.

(iii) Production of I7

Oxygen permeable sheet I7 was produced by the film formation method 3 (airless spray process), following the procedure used for the oxygen permeable sheet I1, except that particles I7 comprising polytetrafluoroethylene and having an average particle size of 0.8 μm were used as the water-repellent particles.

Here, by setting the weight ratio of the particles I7 and the binder during drying and solidification of the coating to 10:90, the ratio of the cumulative pore volume S3 in a diameter range of 0.01 to 0.1 μm and the cumulative pore volume S2 in a diameter range of 0.01 to 10 μm: S3/S2 was controlled to 0.01.

(iv) Production of I8 to I12

Oxygen permeable sheets I8 to I12 were produced by the film formation method 3 (airless spray process), following the procedure used for the oxygen permeable sheet I7, except that S3/S2 was changed to 0.02, 0.05, 0.4, 0.7 or 1, respectively, by changing the weight ratio of the particles I7 and the binder during drying and solidification to 20:80, 40:60, 60:40, 80:20 or 96:4, respectively.

(2) Evaluation of Physical Properties of Oxygen Permeable Sheets

The physical properties of the obtained oxygen permeable sheets were evaluated in the following manner.

Measurement of Specific Surface Area

The specific surface area was measured by a nitrogen adsorption method in which $N_2$ (nitrogen) was used as the adsorption gas, using an "ASAP 2010 instrument" manufactured by Micromeritics Instrument Corporation. Before measurement, each of the oxygen permeable films was subjected to preliminary drying for five hours at 120° C. in vacuum, and thereafter nitrogen was introduced to determine the specific surface area. The results are shown in Tables 1A to 1G.

Measurement of Average Particle Size

The average particle sizes of the water-repellent particles serving as the source materials of the oxygen permeable films were measured by a laser particle size distribution measurement method. As the measurement apparatus, a laser diffraction and scattering particle size distribution measurement apparatus manufactured by HORIBA Ltd. was used. Here, the median diameters of the measurement samples were used as the average particle sizes. The results are shown in Tables 1A to 1G.

Thickness of Oxygen Permeable Film

The thicknesses of the oxygen permeable films were determined by cross-section observations using a micrometer or a scanning electron microscope. It should be noted that "film thickness" shown in Tables 1A to 1F does not include the thickness of each of the porous substrates supporting the films. The results are shown in Tables 1A to 1G.

Measurement of Gurley Number

The overall Gurley number of each of the oxygen permeable sheets was measured using an Ohken type air permeability testing machine manufactured by Asahi Seiko Co. The air pressure was set to 2.5 kgf/cm$^2$, and the size of the test strip of each of the oxygen permeable sheets used for the measurement was set to φ2 cm. The results are shown in Tables 1A to 1G.

Measurement of Contact Angle

The contact angle between each of the oxygen permeable films and water was determined by a drop method, using a dynamic contact angle system "ZR-21" manufactured by Kyowa Interface Science Co., Ltd. Specifically, a water droplet was dropped onto each of the produced films, and the image of the water droplet was captured in a state in which the water droplet was rounded by its own surface tension. Then, the base length (2r) and the height (h) of the water droplet image as viewed from the side were obtained, and the contact angle θ was calculated using the following formula (θ/2 method). The results are shown in Tables 1A to 1G.

$$\theta = 2\tan^{-1}(h/r)$$

Measurement of Pore Size Distribution and Cumulative Pore Volume

For the oxygen permeable films of the oxygen permeable sheets I1 to I10, the pore size distribution and the cumulative pore volume were measured by porosimetry. The measurement by porosimetry was carried out using a Capillary Flow Porometer CFP-1200-AEXL manufactured by POROUS MATERIALS, INC. The results are shown in Table 10.

The measurement was carried out, as necessary, for the oxygen permeable sheets, each of which was a combination of a porous substrate and an oxygen permeable film, and the pore size distribution of each of the oxygen permeable films was obtained by subtracting the pore size distribution of the porous substrate.

Figure 3:
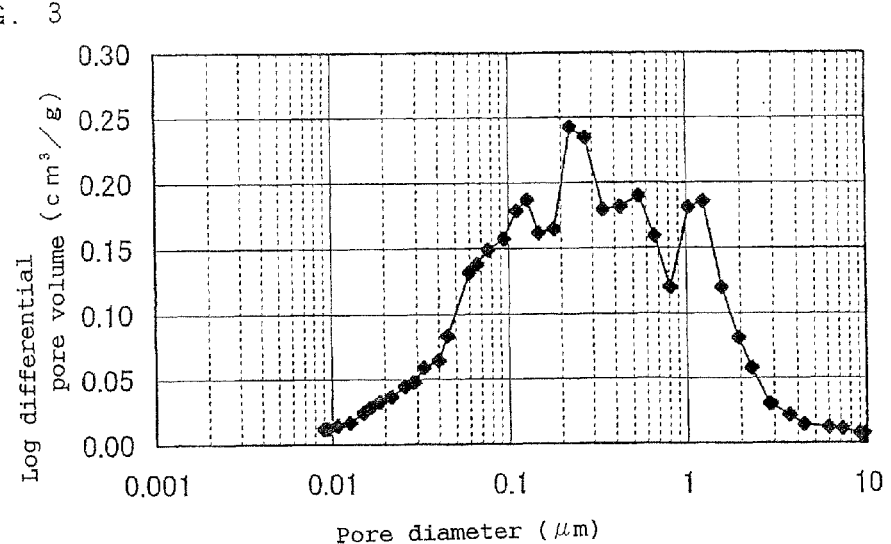
FIG. 3 is a pore size distribution graph showing a relationship between the pore size and the log differential pore volume of the oxygen permeable film.
Figure 4:
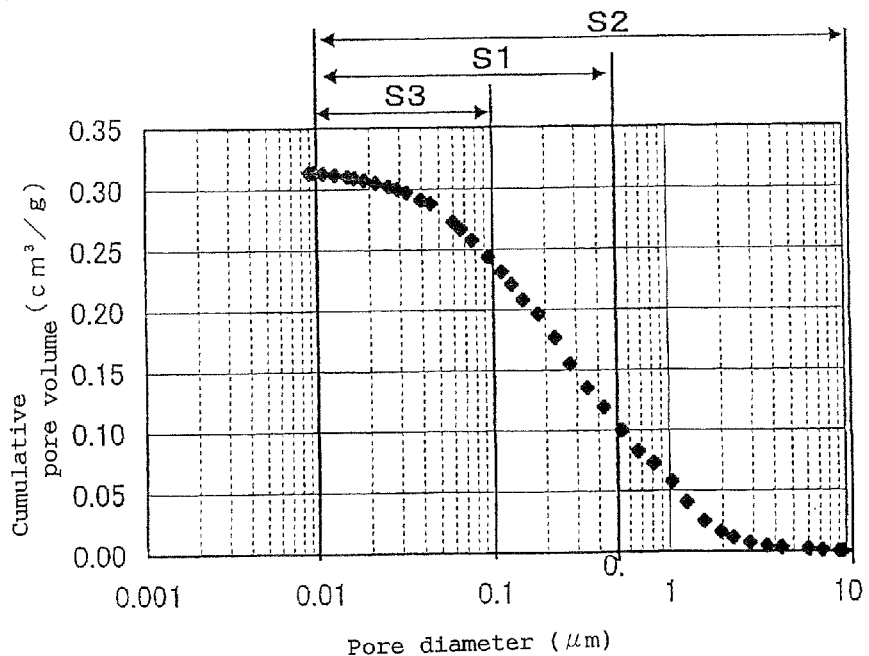
FIG. 4 is a pore size distribution graph showing a relationship between the pore size and the cumulative pore volume of the oxygen permeable film.

A typical example of the measurement results of the pore size distribution is shown in FIG. 3. Furthermore, a typical example of the measurement results of the cumulative pore volume is shown in FIG. 4. In FIG. 4, S1 is the cumulative pore volume of the pores having a diameter of 0.01 to 0.5 μm, S2 is the cumulative pore volume of the pores having a diameter of 0.01 to 10 μm, and S3 is the cumulative pore volume of the pores having a diameter of 0.01 to 0.1 μm.

Measurement of Pore Void Volume (a) The pore void volume according to mercury intrusion porosimetry was measured using an Autopore III 9410 instrument manufactured by SHIMADZU CORPORATION. The conditions are shown below.

Pressure range: 0.5 to 60000 psia

Sample: about 3 cm×2 cm×1 sheet (b) The pore void volume according to a nitrogen adsorption method was measured using an ASAP 2010 instrument manufactured by Micromeritics Instrument Corporation. The conditions are shown below.

Preliminary drying (degassing condition): 24 hours in vacuum
Sample amount: 1 g
Adsorption gas: $N_2$ (nitrogen)

(3) Production of Air Cell

Coin-shaped Air Cell

A coin-shaped air cell as shown in the partial cross-sectional view of FIG. 1 was produced using a predetermined oxygen permeable sheet.

This air cell comprises a negative electrode case 11, a negative electrode 12 that is filled into the negative electrode case and comprises zinc, a ring-shaped insulating gasket 13 disposed at the periphery of the negative electrode case, a separator 14 interposed between the positive electrode and the negative electrode, an air electrode (positive electrode) 15 whose one side faces with the separator, a water-repellent film 16 that is fixed to the other side of the air electrode, an oxygen permeable sheet 17 that is opposite to the water-repellent film, a positive electrode case 18 to whose inner bottom surface the oxygen permeable sheet is fixed, and a sealing sheet 111 that is fixed to the outer bottom surface of the positive electrode case.

An air diffusion chamber 19 is provided between the inner bottom surface of the positive electrode case 18, to which the oxygen permeable sheet 17 is fixed, and the water-repellent film 16. An air intake opening 110 is provided at the bottom of the positive electrode case 18. The water-repellent film 16 serves to supply oxygen to the air electrode 15, while preventing leakage of the electrolyte to the outside of the cell.

The air intake opening 110 is sealed by the sealing sheet 111 when the cell is not in use, and the sealing sheet 111 is peeled off when the cell is used. This is to block the entrance of air into the cell, thus preventing the deterioration of the cell due to self discharge. On the other hand, the oxygen permeable sheet 17 constantly seals the air intake opening 110.

As the air electrode 15, an air electrode obtained by pressure-bonding a catalyst containing a metal oxide, graphite, an activated carbon and a fluorine-based binder as the main components to a net-shaped current collector.

The air electrode 15 was produced in the following manner.

First, 25 kg of water was added to a material mixture comprising 1.5 kg of carbon black, 4.5 kg of an activated carbon, 6 kg of a manganese oxide and 0.88 kg of a fluorocarbon resin powder, and the whole was kneaded and then extruded into a flat belt-shaped sheet. The extruded sheet was rolled by being passed between two rollers heated to about 60° C., thereby obtaining a sheet having a thickness of 0.6 mm.

Next, this sheet was pressure-bonded to one side of a current collector. As the current collector, a current collector obtained by applying graphite to a nickel-plated sheet equivalent to 40 mesh comprising a stainless steel wire having a wire diameter of about 0.15 mm was used.

D1 (a dispersion containing 60 wt % of PTFE) manufactured by Daikin Industries, Ltd. was applied to the current collector side of the resulting structure formed by pressure-bonding the sheet and the current collector, followed by drying for one hour at 250° C. Thereafter, a PTFE porous film (having a Gurley number of 500 seconds) manufactured by Japan Gore-Tex Inc. was attached by pressure-bonding to the side on which D1 had been applied, thereby obtaining an air electrode 15.

The negative electrode 12 was produced in the following manner.

As the zinc constituting the negative electrode, a zinc alloy powder containing Al, Bi and In that had been synthesized by an atomization method was used. 1.3 g of this zinc powder was introduced into the negative electrode case 11, and 400 µL of a 34 wt % potassium hydroxide aqueous solution including 3 wt % of zinc oxide was added thereto, thus obtaining a negative electrode 12.

It should be noted that, although an alkaline electrolyte having a KOH concentration of 34 wt % was used in this test, it is possible to use any alkaline electrolyte having a concentration in the range from 30 wt % to 45 wt %.

ZnO may be dissolved in the electrolyte for inhibiting the self discharge of zinc. The amount of ZnO dissolved may be appropriately adjusted to the extent that ZnO is saturated with the individual alkaline concentrations. Furthermore, an organic anticorrosive may also be dissolved in the electrolyte for inhibiting the generation of a hydrogen gas. It is possible to use any organic anticorrosive that inhibits the generation of hydrogen, and examples thereof include fluoroalkyl polyoxyethylene (SURFLON #S-161 (trade name)) manufactured by Asahi Glass Co., Ltd.

It is also possible to bringing the electrolyte into a gel state by adding thereto a gelling agent. It is possible to use any gelling agent that can turn the alkaline electrolyte into a gel. It is possible to use, for example, sodium polyacrylate, carboxymethyl cellulose, polyvinylalcohol, polyethylene oxide, a polyacrylic acid, sodium polyacrylate and a chitosan gel that have various polymerization degrees, cross-linking degrees or molecular weights.

Cylindrical Air Cell

Figure 2B:
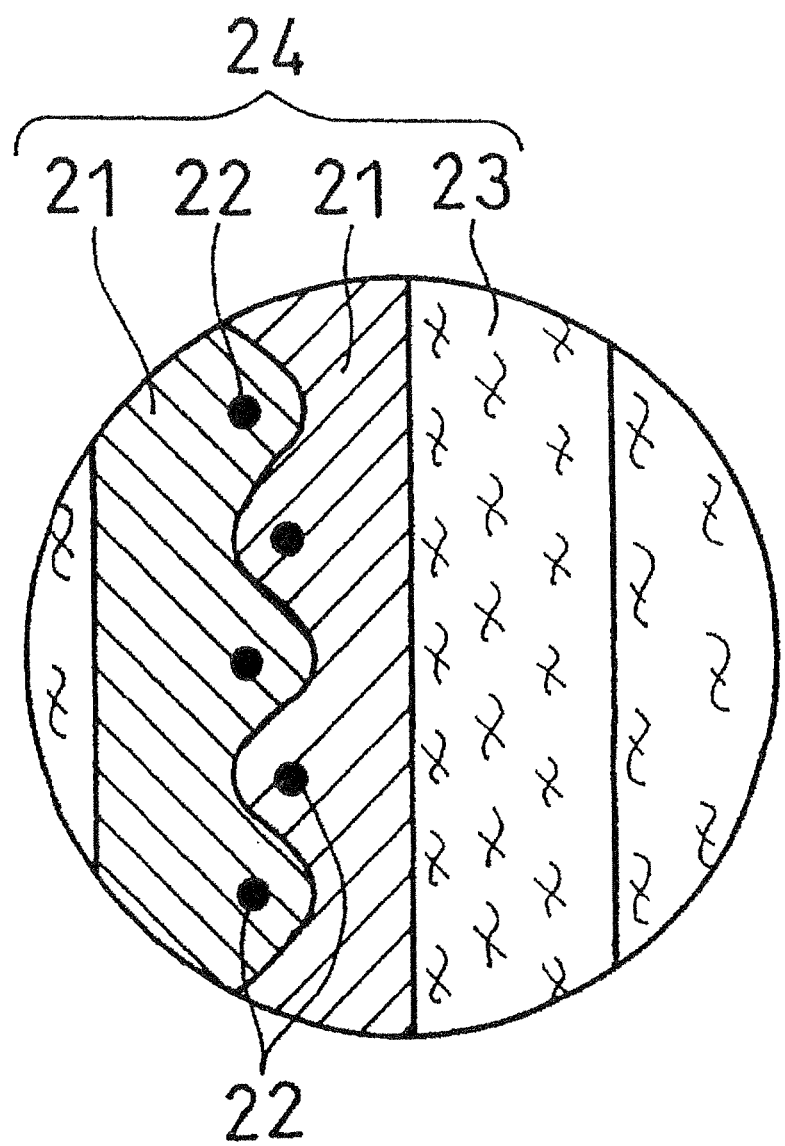
FIG. 2B is a partly enlarged view of FIG. 2A.

An AA-size air-zinc cell as shown in FIG. 2 was produced using a predetermined oxygen permeable sheet. FIG. 2A is a partial cross-sectional view of the air-zinc cell. FIG. 2B is a partial enlarged view of FIG. 2A, and shows a cross section of an air electrode 24 having a three-layer structure comprising a catalyst layer 21, a current collector 22 and a gas diffusion layer 23.

This air-zinc cell comprises a separator 25 in contact with the inner surface of the air electrode, a gelled zinc negative electrode 26 filled into the inner surface of the separator, an oxygen permeable sheet 27 in contact with the outer surface of the air electrode, a positive electrode can 28 to whose inner surface an oxygen permeable sheet is fixed, a resin tube 219 covering the outer surface of the positive electrode can, a sealing sticker 211 that is peeled off before using the cell, tray paper 212, metal caps 213 and 214 sandwiching the exposed portion of the current collector of the air electrode therebetween, an organic sealing agent 215 applied to a portion located 1 mm inward from the opening end of the positive electrode can, a resin sealing body 216 sealing the opening of the positive electrode can, a negative electrode terminal cap 217 integrated with the resin sealing body, and a nail-shaped negative electrode current collecting member 218 connected to the negative electrode terminal cap.

Air intake openings 210 are provided at the side of the positive electrode can 28 and at the resin tube 219. The cap 213 is spot-welded to the bottom of the positive electrode can 28. The separator 25 was obtained by laminating a vinylon nonwoven fabric with cellophane.

The air intake openings 210 are sealed by the sealing sticker 211 when the cell is not in use, and the sealing sticker 211 is peeled off when the cell is used. On the other hand, the oxygen permeable sheet 27 constantly seals the air intake openings 210.

The air electrode 24 was produced in the following manner.

First, 25 kg of water was added to a material mixture comprising 1.5 kg of carbon black, 4.5 kg of an activated carbon, 6 kg of a manganese oxide and 0.88 kg of a fluorocarbon resin powder, and the whole was kneaded and then extruded into a flat belt-shaped sheet. The extruded sheet was rolled by being passed between two rollers heated to about 60° C., thereby obtaining a sheet of a catalyst layer 1 having a thickness of 0.6 mm.

Next, a pair of sheets of the catalyst layers 21 were pressure-bonded to each side of a current collector 22. As the current collector 22, a current collector obtained by nickel-plating a sheet equivalent to 40 mesh comprising a stainless steel wire having a wire diameter of about 0.15 mm was used. The obtained flat plate comprising the catalyst layers 21 and the current collector 22 was bent into the shape of a cylinder. Thereafter, the catalyst layers 21 were partly removed such that the current collector 22 was exposed, thus forming a connecting portion to the positive electrode can.

Next, a mixture comprising carbon black, a fluorocarbon resin, water and a polyoxyethylene alkyl ester-based surfactant was formed into the shape of a sheet of about 200 µm, obtaining a sheet of a gas diffusion layer 23. This sheet was wound around the cylinder from the outside two times or more, thereby obtaining an air electrode 24 having a three-layer structure.

The gelled zinc negative electrode 26 was produced in the following manner.

A 40 wt % potassium hydroxide aqueous solution including 3 wt % of zinc oxide was formed into a gel by adding thereto 3 wt % of sodium polyacrylate and 1 wt % of carboxymethyl cellulose. To the resulting gel, a zinc powder (zinc alloy powder containing the elements Al, Bi and In) was added in an amount twice the amount of the gel, thereby obtaining a gelled zinc negative electrode 26. The gelled zinc negative electrode 26 had a theoretical capacity of 3700 mAh.

In addition, the same alkaline electrolyte as used for the coin-shaped air cell was used.

While the zinc constituting the negative electrode may be a simple substance, it is also possible to use a zinc alloy including various metals other than zinc. The zinc alloy powder used for the air cell is synthesized from the source material mixture including predetermined elements in predetermined amounts by an atomization method, and subjected to classification. As the zinc alloy, it is preferable to use, for example, an alloy comprising Zn and Al, and an alloy including Zn and Al and further including at least one selected from the group consisting of Bi, In, Ca, Sn and Pb. The amount of the elements other than Zn contained in the zinc alloy is preferably 20 to 5000 ppm.

Zinc and the zinc alloy may be used in any form, and may be used in the form of a powder, a porous material or a plate, for example. The porous material may be produced, for example, by molding a zinc alloy powder into a pellet and sintering it in the range of 350 to 500° C. in a reducing atmosphere, or simultaneously performing molding and sintering by hot pressing. Usually, a flat pellet is produced for a coin-shaped cell, and a tubular pellet is produced for a cylindrical cell.

The plate-shaped zinc alloy was obtained by forming a bulk alloy into the form of a plate using a roll press or the like. The thickness of the plate is arbitrary since it is adjusted according to the cell case. The surface of the plate may be smooth, perforated, or may have irregularities.

(4) Evaluation of Air Cells

With the air openings of the cell being opened so that the outside air was communicated with the air electrode, each of the cells was stored for 10 days at 20° C. in a constant temperature bath having a relative humidity of 60%. Thereafter, each of the cells was discharged with various currents, and the discharge capacity C1 (mAh) of the cell was obtained. The obtained discharge capacity C1 and the theoretical capacity C2 (mAh) calculated from the weight of zinc included in each of the cells were substituted in the following formula (1) to obtain the discharge efficiency (P (%)) of the cell. The results are shown in Tables 2 to 9. It can be said that the larger the P value of the cell is, the more excellent the discharge characteristics are.

$$P(\%) = (C1/C2) \times 100 \quad (1)$$

(5) Evaluation of Water Vapor Permeation Inhibiting Capability

Since water is generated at the cathode side electrode in a mobile fuel cell (DMFC), there is the problem that the air channel is blocked by water when the flow amount (flow rate) of air supplied to the cathode is small, or when the cell temperature is low. Such a phenomenon is called flooding, and increases the possibility of degrading the power generation characteristics. In particular, flooding tends occur when air has a high humidity, since the allowable amount of saturated water vapor is small.

On the other hand, when the oxygen permeable sheet of the present invention is disposed at the channel for supplying air to the cathode of a fuel cell, it is possible to supply dry air into the fuel cell, so that it is possible to inhibit the flooding phenomenon and improve the power generation characteristics. Therefore, assuming that air taken in from the outside air is passed through the oxygen permeable sheet and supplied to the cathode of a fuel cell, the value of the dew-point difference $T$ (° C.) of the air was defined as follows. A higher T value means a superior performance of the oxygen permeable sheet.

$T$(° C.)=(dew point(° C.) of air before passing through oxygen permeable sheet)−(dew point(° C.) of air after passing through oxygen permeable sheet)

Air taken in from the outside air was passed through a predetermined oxygen permeable sheet, then the dew point was obtained before and after the passage, and the T value was determined using the above formula. The results are shown in Tables 2 to 10. In addition, the dew point of the air taken in from the outside air before it passed through the oxygen permeable sheet was uniformly set to ° C.

(6) Evaluation Results for Air Cells and Evaluation Results for Water Vapor Permeation Inhibiting Capability (i) The Results for Example 1 are Shown in Table 2.

TABLE 2

| | Sheet | P in coin-shaped air cell at discharge current of 100 mA | P in cylindrical air cell at discharge current of 1 A (%) | T value (° C.) |
|---|---|---|---|---|
| Sample No. 1 | A1 | 58 | 57 | 14 |
| Sample No. 2 | A2 | 58 | 57 | 13 |
| Sample No. 3 | A3 | 67 | 65 | 18 |
| Sample No. 4 | A4 | 70 | 71 | 20 |
| Sample No. 5 | A5 | 70 | 71 | 21 |
| Sample No. 6 | A6 | 71 | 70 | 20 |
| Sample No. 7 | A7 | 70 | 71 | 21 |
| Sample No. 8 | A8 | 70 | 70 | 20 |
| Sample No. 9 | A9 | 67 | 67 | 17 |
| Sample No. 10 | A10 | 67 | 66 | 18 |
| Sample No. 11 | A11 | 66 | 67 | 17 |
| Sample No. 12 | A12 | 66 | 66 | 18 |
| Sample No. 13 | A13 | 65 | 65 | 17 |
| Sample No. 14 | A14 | 56 | 57 | 13 |
| Sample No. 15 | A15 | 57 | 56 | 14 |
| Com. Ex. 1 | A16 | 5 | 3 | 0 |
| Com. Ex. 2 | A17 | 15 | 12 | 0 |
| Com. Ex. 3 | A18 | 13 | 12 | 0 |
| Com. Ex. 4 | A19 | 11 | 12 | 0 |

(ii) The Results for Example 2 are Shown in Table 3.

TABLE 3

|  | Sheet | P in coin-shaped air cell at discharge current of 100 mA (%) | P in cylindrical air cell at discharge current of 1 A (%) | T value (° C.) |
|---|---|---|---|---|
| Sample No. 16 | B1 | 58 | 57 | 14 |
| Sample No. 17 | B2 | 58 | 57 | 13 |
| Sample No. 18 | B3 | 67 | 65 | 18 |
| Sample No. 19 | B4 | 66 | 66 | 18 |
| Sample No. 20 | B5 | 70 | 71 | 21 |
| Sample No. 21 | B6 | 71 | 70 | 20 |
| Sample No. 22 | B7 | 70 | 71 | 21 |
| Com. Ex. 5 | A16 | 5 | 3 | 0 |
| Com. Ex. 6 | A17 | 15 | 12 | 0 |
| Com. Ex. 7 | A18 | 13 | 12 | 0 |
| Com. Ex. 8 | A19 | 11 | 12 | 0 |

(iii) The Results for Example 3 are Shown in Table 4.

TABLE 4

|  | Sheet | P in coin-shaped air cell at discharge current of 102 mA (%) | P in cylindrical air cell at discharge current of 1.02 A (%) | T value (° C.) |
|---|---|---|---|---|
| Sample No. 23 | C1 | 68 | 65 | 15 |
| Sample No. 24 | C2 | 62 | 59 | 16 |
| Sample No. 25 | C3 | 60 | 58 | 15 |
| Sample No. 26 | C4 | 59 | 58 | 16 |
| Sample No. 27 | C5 | 61 | 57 | 14 |
| Sample No. 28 | C6 | 62 | 59 | 13 |
| Sample No. 29 | C7 | 42 | 41 | 10 |
| Com. Ex. 9 | A16 | 5 | 3 | 0 |
| Com. Ex. 10 | A17 | 13 | 12 | 0 |
| Com. Ex. 11 | A18 | 11 | 11 | 0 |
| Com. Ex. 12 | A19 | 11 | 12 | 0 |

(iv) The Results for Example 4 are Shown in Table 5.

TABLE 5

|  | Sheet | P in coin-shaped air cell at discharge current of 105 mA (%) | P in cylindrical air cell at discharge current of 1.05 A (%) | T value (° C.) |
|---|---|---|---|---|
| Sample No. 30 | D1 | 56 | 55 | 12 |
| Sample No. 31 | D2 | 55 | 54 | 13 |
| Sample No. 32 | D3 | 68 | 65 | 17 |
| Sample No. 33 | D4 | 66 | 64 | 18 |
| Sample No. 34 | D5 | 70 | 71 | 20 |
| Sample No. 35 | D6 | 71 | 71 | 21 |
| Sample No. 36 | D7 | 70 | 70 | 20 |
| Sample No. 37 | D8 | 72 | 71 | 21 |
| Sample No. 38 | D9 | 70 | 70 | 20 |
| Sample No. 39 | D10 | 66 | 64 | 18 |
| Sample No. 40 | D11 | 64 | 65 | 17 |
| Sample No. 41 | D12 | 63 | 63 | 18 |
| Sample No. 42 | D13 | 63 | 63 | 18 |
| Sample No. 43 | D14 | 56 | 55 | 12 |
| Sample No. 44 | D15 | 55 | 54 | 12 |
| Com. Ex. 13 | A16 | 4 | 3 | 0 |
| Com. Ex. 14 | A17 | 14 | 11 | 0 |
| Com. Ex. 15 | A18 | 13 | 12 | 0 |
| Com. Ex. 16 | A19 | 10 | 11 | 0 |

(v) The Results for Example 5 are Shown in Table 6.

TABLE 6

|  | Sheet | P in coin-shaped air cell at discharge current of 107 mA (%) | P in cylindrical air cell at discharge current of 1.07 A (%) | T value (° C.) |
|---|---|---|---|---|
| Sample No. 45 | E1 | 56 | 55 | 12 |
| Sample No. 46 | E2 | 55 | 54 | 13 |
| Sample No. 47 | E3 | 68 | 65 | 17 |
| Sample No. 48 | E4 | 66 | 64 | 18 |
| Sample No. 49 | E5 | 70 | 71 | 20 |
| Sample No. 50 | E6 | 71 | 71 | 21 |
| Sample No. 51 | E7 | 70 | 70 | 20 |
| Sample No. 52 | E8 | 72 | 71 | 21 |
| Sample No. 53 | E9 | 70 | 70 | 20 |
| Sample No. 54 | E10 | 66 | 64 | 18 |
| Sample No. 55 | E11 | 64 | 65 | 17 |
| Sample No. 56 | E12 | 63 | 63 | 18 |
| Sample No. 57 | E13 | 56 | 55 | 13 |
| Sample No. 58 | E14 | 56 | 55 | 12 |
| Com. Ex. 17 | A16 | 4 | 3 | 0 |
| Com. Ex. 18 | A17 | 13 | 10 | 0 |
| Com. Ex. 19 | A18 | 11 | 10 | 0 |
| Com. Ex. 20 | A19 | 10 | 11 | 0 |

(vi) The Results for Example 6 are Shown in Table 7.

TABLE 7

|  | Sheet | P in coin-shaped air cell at discharge current of 110 mA (%) | P in cylindrical air cell at discharge current of 1.1 A (%) | T value (° C.) |
|---|---|---|---|---|
| Sample No. 59 | F1 | 65 | 65 | 14 |
| Sample No. 60 | F2 | 70 | 71 | 18 |
| Sample No. 61 | F3 | 71 | 70 | 21 |
| Sample No. 62 | F4 | 74 | 75 | 20 |
| Sample No. 63 | F5 | 75 | 76 | 20 |
| Sample No. 64 | F6 | 74 | 75 | 21 |
| Sample No. 65 | F7 | 76 | 77 | 21 |
| Sample No. 66 | F8 | 75 | 76 | 20 |
| Sample No. 67 | F9 | 75 | 76 | 21 |
| Sample No. 68 | F10 | 74 | 75 | 20 |
| Sample No. 69 | F11 | 75 | 76 | 20 |
| Sample No. 70 | F12 | 70 | 71 | 21 |
| Sample No. 71 | F13 | 65 | 65 | 14 |
| Com. Ex. 21 | A16 | 3 | 3 | 0 |
| Com. Ex. 22 | A17 | 12 | 10 | 0 |
| Com. Ex. 23 | A18 | 11 | 9 | 0 |
| Com. Ex. 24 | A19 | 9 | 11 | 0 |

(vii) The Results for Example 7 are Shown in Table 8.

TABLE 8

|  | Sheet | P in coin-shaped air cell at discharge current of 112 mA (%) | P in cylindrical air cell at discharge current of 1.12 A (%) | T value (° C.) |
|---|---|---|---|---|
| Sample No. 72 | G1 | 55 | 55 | 14 |
| Sample No. 73 | G2 | 63 | 63 | 19 |
| Sample No. 74 | G3 | 61 | 62 | 18 |
| Sample No. 75 | G4 | 62 | 62 | 19 |
| Sample No. 76 | G5 | 63 | 64 | 19 |
| Sample No. 77 | G6 | 62 | 62 | 20 |
| Sample No. 78 | G7 | 64 | 65 | 18 |
| Sample No. 79 | G8 | 63 | 63 | 19 |
| Sample No. 80 | G9 | 55 | 56 | 14 |
| Sample No. 81 | G10 | 63 | 63 | 19 |
| Sample No. 82 | G11 | 61 | 62 | 18 |
| Sample No. 83 | G12 | 62 | 62 | 19 |
| Sample No. 84 | G13 | 63 | 64 | 19 |
| Sample No. 85 | G14 | 62 | 62 | 20 |

TABLE 8-continued

|  | Sheet | P in coin-shaped air cell at discharge current of 112 mA (%) | P in cylindrical air cell at discharge current of 1.12 A (%) | T value (° C.) |
|---|---|---|---|---|
| Sample No. 86 | G15 | 64 | 65 | 18 |
| Sample No. 87 | G16 | 63 | 63 | 19 |
| Sample No. 88 | G17 | 55 | 56 | 14 |
| Com. Ex. 25 | A16 | 3 | 3 | 0 |
| Com. Ex. 26 | A17 | 11 | 8 | 0 |
| Com. Ex. 27 | A18 | 9 | 9 | 0 |
| Com. Ex. 28 | A19 | 9 | 9 | 0 |

(viii) The Results for Example 8 are Shown in Table 9.

TABLE 9

|  | Sheet | P in coin-shaped air cell at discharge current of 115 mA (%) | P in cylindrical air cell at discharge current of 1.15 A (%) | T value (° C.) |
|---|---|---|---|---|
| Sample No. 89 | H1 | 66 | 65 | 18 |
| Sample No. 90 | H2 | 67 | 66 | 17 |
| Sample No. 91 | H3 | 68 | 65 | 16 |
| Sample No. 92 | H4 | 65 | 65 | 17 |
| Sample No. 93 | H5 | 64 | 67 | 15 |
| Sample No. 94 | H6 | 67 | 66 | 17 |
| Sample No. 95 | H7 | 67 | 68 | 14 |
| Com. Ex. 29 | A16 | 3 | 2 | 0 |
| Com. Ex. 30 | A17 | 8 | 7 | 0 |
| Com. Ex. 31 | A18 | 9 | 9 | 0 |
| Com. Ex. 32 | A19 | 6 | 6 | 0 |

(viii) The Results for Example 9 are Shown in Table 10.

TABLE 10

|  | Sheet | P in coin-shaped air cell at discharge current of 100 mA (%) | P in cylindrical air cell at discharge current of 1 A (%) | T value (° C.) | S1/S2 (Nos. 96-101) | Pore void fraction (%) |
|---|---|---|---|---|---|---|
| Sample No. 96 | I1 | 58 | 57 | 14 | 0.01 | 15 |
| Sample No. 97 | I2 | 67 | 65 | 17 | 0.05 | 20 |
| Sample No. 98 | I3 | 68 | 66 | 18 | 0.15 | 40 |
| Sample No. 99 | I4 | 69 | 69 | 19 | 0.5 | 65 |
| Sample No. 100 | I5 | 72 | 71 | 20 | 0.8 | 90 |
| Sample No. 101 | I6 | 71 | 71 | 20 | 1 | 93 |

|  | Sheet | P in coin-shaped air cell at discharge current of 100 mA (%) | P in cylindrical air cell at discharge current of 1 A (%) | T value (° C.) | S3/S2 (Nos. 102-107) | Pore void fraction (%) |
|---|---|---|---|---|---|---|
| Sample No. 102 | I7 | 60 | 59 | 14 | 0.01 | 16 |
| Sample No. 103 | I8 | 69 | 67 | 19 | 0.02 | 20 |
| Sample No. 104 | I9 | 70 | 69 | 20 | 0.05 | 40 |
| Sample No. 105 | I10 | 72 | 71 | 21 | 0.4 | 70 |
| Sample No. 106 | I11 | 74 | 73 | 23 | 0.7 | 90 |
| Sample No. 107 | I12 | 73 | 72 | 22 | 1 | 94 |

(7) Considerations of Results

Consideration of Results for Example 1

The evaluation results for the air cells and the evaluation results for the water vapor permeation inhibiting capability are shown in Table 2.

In Table 2, in the case of Sample Nos. 1 to 15 (A1 to A15), the discharge efficiency P (%) obtained when the coin-shaped air cell was discharged with a discharge current of 100 mA was not less than 56%, the discharge efficiency P (%) obtained when the cylindrical air cell was discharged with a discharge current of 1 A was not less than 56%, and the dew-point difference T (° C.) was not less than 13° C., so that they were superior to Comparative Examples 1 to 4 (A16 to A19).

Since Sample Nos. 3 to 13 had an average particle size of the water-repellent particles of 0.01 to 50 μm, they all had a P value of not less than 65% and a T value of not less than 17° C., so that they were further superior. Furthermore, when the average particle size of the water-repellent particles was 0.1 to 15 μm, the P value was not less than 70%, and the T value was not less than 20° C.

As such, the oxygen permeable films comprising an aggregate of water-repellent particles and having an average particle size of the particles of 0.01 to 50 μm exhibited a high water vapor permeation inhibiting capability, which resulted in improved oxygen permeability, thus showing favorable results with respect to the cell characteristics and the like. Further, in the case of Sample Nos. 1 to 15, the contact angle between the oxygen permeable film and water was not less than 120°, whereas the contact angle between the film and water was not more than 110° in the case of Comparative Examples 1 to 4. Accordingly, it is seen that the contact angle between the aggregate of water-repellent particles and water is preferably not less than 120°. Further, when the contact angle between the aggregate of water-repellent particles and water was not less than 140°, the P value was not less than 70%, and the T value was not less than 20° C.

Consideration of Results for Example 2

The evaluation results for the air cells and the evaluation results for the water vapor permeation inhibiting capability are shown in Table 3.

In Table 3, in the case of Sample Nos. 16 to 22 (B1 to B7), the discharge efficiency P (%) obtained when the coin-shaped air cell was discharged with a discharge current of 100 mA was not less than 58%, the discharge efficiency P (%) obtained when the cylindrical air cell was discharged with a discharge current of 1 A was not less than 57%, and the dew-point difference T (° C.) was not less than 13C, so that they were superior to Comparative Examples 5 to 8 (A16 to A19). On the other hand, the P values of Comparative Examples 5 to 8 were as low as not more than 15% for all of the cells, and the T values were 0° C. From the foregoing, it was found that the oxygen permeable films in which the aggregate of water-repellent particles having an average particle size of 0.01 to 50 μm was integrated by fusion had a superior water vapor permeation inhibiting capability.

Consideration of Results for Example 3

The evaluation results for the air cells and the evaluation results for the water vapor permeation inhibiting capability are shown in Table 4.

In Table 4, in the case of Sample Nos. 23 to 29 (C1 to C7), the discharge efficiency P (%) obtained when the coin-shaped air cell was discharged with a discharge current of 102 mA was not less than 42%, the discharge efficiency P (%) obtained when the cylindrical air cell was discharged with a discharge current of 1.02 A was not less than 41%, and the dew-point difference T (° C.) was not less than 10° C., so that they were superior to Comparative Examples 9 to 12 (A16 to A19). On the other hand, the P values of Comparative Examples 9 to 12 were as low as not more than 13% for all of the cells, and the T values were 0° C.

Sample Nos. 23 to 28 had a P value in the neighborhood of 60%, and a T value in the neighborhood of 15° C., so that they were further superior. On the other hand, Sample No. 29 had a P value of about 40%, and a T value of 10° C. Accordingly, it was found that a fluorocarbon resin was more effective than a silicone resin as the water-repellent particles constituting the oxygen permeable film. Furthermore, it was found that polytetrafluoroethylene, polyvinyl fluoride, polyvinylidene fluoride and the like are preferable as the fluorocarbon resin.

Consideration of Results for Example 4

The evaluation results for the air cells and the evaluation results for the water vapor permeation inhibiting capability are shown in Table 5.

In Table 5, in the case of Sample Nos. 30 to 44 (D1 to D15), the discharge efficiency P (%) obtained when the coin-shaped air cell was discharged with a discharge current of 105 mA was not less than 55%, the discharge efficiency P (%) obtained when the cylindrical air cell was discharged with a discharge current of 1.05 A was not less than 54%, and the dew-point difference T (° C.) was not less than 12° C., so that they were superior to Comparative Examples 13 to 16 (A16 to A19).

Sample Nos. 32 to 42 had a P value of not less than 63%, and a T value of not less than 17C, so that they were more favorable. On the other hand, Sample Nos. 30, 31, 43 and 44 had a P value in the neighborhood of 55%, and a T value in the neighborhood of 12° C. Further, Sample Nos. 34 to 38 had a value of about 70%, and a T value of not less than 20° C., so that they showed particularly favorable results.

From the foregoing, it was found that the water vapor permeation inhibiting effect was improved when the specific surface area of the oxygen permeable film of the present invention was not less than 0.1 m²/g and not more than 500 m²/g. Furthermore, it was found that the water vapor permeation inhibiting effect was further improved when the specific surface area was not less than 1 m²/g and not more than 100 m²/g.

Consideration of Results for Example 5

The evaluation results for the air cells and the evaluation results for the water vapor permeation inhibiting capability are shown in Table 6.

In Table 6, in the case of Sample Nos. 45 to 58 (E1 to E14), the discharge efficiency P (%) obtained when the coin-shaped air cell was discharged with a discharge current of 107 mA was not less than 55%, the discharge efficiency P (%) obtained when the cylindrical air cell was discharged with a discharge current of 1.07 A was not less than 54%, and the dew-point difference T (° C.) was not less than 12° C., so that they were superior to Comparative Examples 17 to 20 (A16 to A19).

Sample Nos. 47 to 56 had a P value of not less than 63%, and a T value of not less than 17° C., so that they were more favorable. On the other hand, Sample Nos. 45, 46, 57 and 58 had a P value in the neighborhood of 55%, and a T value in the neighborhood of 12° C. Further, Sample Nos. 49 to 53 had a value of not less than 70%, and a T value of not less than 20° C., so that they showed particularly favorable results.

From the foregoing, it was found that the water vapor permeation inhibiting effect was improved when the thickness of the oxygen permeable film of the present invention was not less than 0.1 μm and not more than 1000 μm. Furthermore, it was found that the water vapor permeation inhibiting effect was further improved when the thickness was not less than 5 μm and not more than 500 μm.

Consideration of Results for Example 6

The evaluation results for the air cells and the evaluation results for the water vapor permeation inhibiting capability are shown in Table 7.

In Table 7, in the case of Sample Nos. 59 to 71 (F1 to F13), the discharge efficiency P (%) obtained when the coin-shaped air cell was discharged with a discharge current of 110 mA was not less than 65%, the discharge efficiency P (%) obtained when the cylindrical air cell was discharged with a discharge current of 1.1 A was not less than 65%, and the dew-point difference T (° C.) was not less than 14° C., so that they were superior to Comparative Examples 21 to 24 (A16 to A19).

The reason that the excellent effect was achieved as described above was that, in the case of the oxygen permeable sheets having a three-layer structure in which the oxygen permeable film was sandwiched between a pair of porous substrates, it was possible to prevent the water-repellent particles from being gradually detached when air passing through the film, thus preventing a decrease in the water repellent effect.

Consideration of Results for Example 7

The evaluation results for the air cells and the evaluation results for the water vapor permeation inhibiting capability are shown in Table 8.

In Table 8, in the case of Sample Nos. 72 to 88 (G1 to G17), the discharge efficiency P (%) obtained when the coin-shaped air cell was discharged with a discharge current of 112 mA was not less than 55%, the discharge efficiency P (%) obtained when the cylindrical air cell was discharged with a discharge current of 1.12 A was not less than 55%, and the dew-point difference T (° C.) was not less than 14C, so that they were superior to Comparative Examples 25 to 28 (A16 to A19).

When comparing Sample Nos. 72, 73 and 81, which used a porous resin film as the porous substrate, and Sample Nos. 74 to 80 and Nos. 82 to 88, which used a mesh or a nonwoven fabric as the porous substrate, their characteristics are at comparable levels and favorable. Therefore, the form of the porous substrate in the oxygen permeable sheet may also be a mesh, a nonwoven fabric or the like.

In addition, from the above-described evaluations, it was found that polyethylene, polypropylene, polytetrafluoroethylene, vinylon, polyphenylene sulfide (PPS), polybutylene terephthalate (PBT), nylon and like may be preferably used as the porous substrate.

Consideration of Results for Example 8

The evaluation results for the air cells and the evaluation results for the water vapor permeation inhibiting capability are shown in Table 9.

In Table 9, in the case of Sample Nos. 89 to 95 (H1 to H7), the discharge efficiency P (%) obtained when the coin-shaped air cell was discharged with a discharge current of 115 mA was not less than 64%, the discharge efficiency P (%) obtained when the cylindrical air cell was discharged with a discharge current of 1.15 A was not less than 65%, and the dew-point difference T (° C.) was not less than 14° C., so that they were superior to Comparative Examples 29 to 32 (A16 to A19).

It seems that, when a porous substrate comprising a metal was used for the support of the oxygen permeable film, the water-repellent particles could be firmly fixed to the metal portion of the substrate, thus maintaining the water vapor permeation inhibiting effect more effectively. With regard to the kind of the metal, it is possible to use all metals that can be processed into a porous state, including, for example, iron and titanium, in addition to the metals listed in Table 1B.

In addition, the Gurley numbers of the oxygen permeable sheets of Sample Nos. 47 to 56 (E3 to E12), which showed more favorable characteristics among Sample Nos. 45 to 58 (E1 to E14) in Table 6, were not less than 0.5 seconds and not more than 50000 seconds. Further, the Gurley numbers of the oxygen permeable sheets of Sample Nos. 49 to 53 (E5 to E9), which showed even more favorable characteristics, were not less than 10 seconds and not more than 20000 seconds. Furthermore, the Gurley numbers of the Sample Nos. 62 to 70 (E4 to E12), which showed more favorable characteristics among Sample Nos. 59 to 71 (F1 to F13) in Table 7, were not less than 10 seconds and not more than 20000 seconds.

Consideration of Results for Example 9

The evaluation results for the air cells and the evaluation results for the water vapor permeation inhibiting capability are shown in Table 10.

In Table 10, in the case of Sample Nos. 96 to 101, the discharge efficiency P (%) obtained when the coin-shaped air cell was discharged with a discharge current of 100 mA, the discharge efficiency P (%) obtained when the cylindrical air cell was discharged with a discharge current of 1 A, and the dew-point difference T (° C.) each showed a high value. Therefore, it can be said that the effect can be achieved when S1/S2 is not less than 0.01. However, in the case of Sample No. 101, in which S1/S2 was 1, cracking and detachment occurred in the layer of the water-repellent particles since the amount of the binder was small. No cracking and detachment were observed in Sample Nos. 96 to 101. Therefore, S1/S2 is preferably not less than 0.01 and not more than 0.8.

Furthermore, by changing S1/S2 from 0.01 to 0.05, a significant increase of the P value and the T value was observed. In the case of these samples whose oxygen permeable films have the same thickness, a tendency was observed in which the specific surface area increased with a change of S1/S2. Since the thicknesses of the oxygen permeable films were the same, the increase of the specific surface areas is attributed to the increase of the micropores inside the film. Accordingly, it can be seen that, when the proportion of the micropores present increases to a certain level, the effect of inhibiting the permeation of water vapor becomes prominent. Therefore, the ratio of the cumulative pore volume S1 in a diameter range of 0.01 to 0.5 μm and the cumulative pore volume S2 in a diameter range of 0.01 to 10 μm: S1/S2 is preferably not less than 0.05 and not more than 0.8.

In the case of Sample Nos. 102 to 107, the P value and the T value each showed a high value. Therefore, it can be said that the effect can be achieved when the ratio of the cumulative pore volume S3 in a diameter range of 0.01 to 0.1 μm and the cumulative pore volume S2 in a diameter range of 0.01 to 10 μm: S3/S2 is not less than 0.01. However, Sample No. 107, in which S3/S2 was 1, cracking and detachment occurred in the layer of the water-repellent particles since the amount of the binder was small. No cracking and detachment were observed in Sample Nos. 102 to 106. Therefore, S3/S2 is preferably not less than 0.01 and not more than 0.7.

Further, a significant increase was observed by changing S3/S4 from 0.01 to 0.02. Therefore, it can be said that S3/S2 is preferably not less than 0.02 and not more than 0.7.

Furthermore, when comparing the samples in which the S1/S2 value and the S3/S2 value were the same, for example, Sample No. 96 with Sample No. 102, and Sample No. 97 with Sample No. 104, Sample No. 102 and Sample No. 104 showed a higher value for both the P value and the T value. Accordingly, it is seen that the effect of inhibiting the permeation of water vapor can be increased further by increasing the proportion of the pores having a smaller diameter present.

Additionally, the pore void fractions of Sample Nos. 96 to 107 are shown in Table 10. In the case of Sample Nos. 96 and 102, which had a pore void fraction lower than 20%, the discharge efficiency P (%) obtained when the coin-shaped air cell was discharged with a discharge current 100 mA, and the discharge efficiency P (%) obtained when the cylindrical air cell was discharged with a discharge current of 1 A both showed a value not more than 60%; however, in the case of Sample Nos. 97 to 101 and Nos. 103 to 107, which had a pore void fraction of not more than 20%, the above-described P (%) value was not less than 65%. As such, it is seen that the pore void fraction of the oxygen permeable film is preferably not less than 20%.

On the other hand, in the case of Sample Nos. 101 and 107, cracking and detachment occurred in the layer of the water-repellent particles since the amount of the binder was small, and the proportion of non-defective products that could be actually used was about 10%. No cracking and detachment were observed in Sample Nos. 96 to 100 and Nos. 102 to 106.

From the above-described results, it is seen that the pore void fraction of the oxygen permeable film is preferably 20 to 90%.

INDUSTRIAL APPLICABILITY

The oxygen permeable film according to the present invention has a high capability of inhibiting the permeation of water vapor, and therefore can be evolved for various applications. Examples of the applications include the following.
(1) A purifying apparatus for removing moisture from air to produce dry air or oxygen.
(2) An apparatus for exchanging indoor air excluding water vapor with outdoor air.
(3) A wrapping material for inhibiting the entrance of moisture in air into food being preserved.
(4) An air intake mechanism of an air cell and a fuel cell for taking in oxygen in air to generate power. It should be noted that these applications are merely examples, and the applicable range of the present invention is not limited to these.

The invention claimed is:

1. An oxygen permeable film comprising water-repellent, fluorocarbon resin particles,
    wherein
    said water-repellent particles are comprised of fluorocarbon resin particles having an average particle size of 0.01 to 50 μm,
    said oxygen permeable film has a contact angle with water of not less than 130°,
    said oxygen permeable film comprises a film surface and pores having inner walls, and
    said fluorocarbon resin particles are fused in point contact with one another at a temperature of 10° C. to 60° C. lower than the melting point of the resin, with a provision that when the fluorocarbon resin particles comprise polytetrafluoroethylene, the fluorocarbon resin particles are fused at a temperature of 250° C. to 310° C., and said fluorocarbon resin particles form irregularities on the film surface and the inner walls of the pores.

2. The oxygen permeable film in accordance with claim 1, wherein said fluorocarbon resin is at least one selected from the group consisting of polytetrafluoroethylene, polyvinyl fluoride and polyvinylidene fluoride.

3. The oxygen permeable film in accordance with claim 1, wherein said oxygen permeable film has a specific surface area of not less than 0.1 m$^2$/g and not more than 500 m$^2$/g.

4. The oxygen permeable film in accordance with claim 1, wherein said oxygen permeable film has a thickness of not less than 0.1 μm and not more than 1000 μm.

5. The oxygen permeable film in accordance with claim 1, wherein said water-repellent particles comprise pores having a diameter of not more than 0.5 μm.

6. An oxygen permeable sheet comprising the oxygen permeable film according to claim 1 and at least one porous substrate supporting said film thereon.

7. The oxygen permeable sheet in accordance with claim 6, wherein said oxygen permeable film is sandwiched between a pair of said porous substrates so as to have a three-layer structure.

8. The oxygen permeable sheet in accordance with claim 6, wherein a material of said substrate is at least one selected from the group consisting of polyethylene, polypropylene, polytetrafluoroethylene, vinylon, polyphenylene sulfide, polybutylene terephthalate and nylon.

9. The oxygen permeable sheet in accordance with claim 6, wherein said substrate has a form of a mesh or a nonwoven fabric.

10. The oxygen permeable sheet in accordance with claim 6, wherein said substrates comprise a perforated metal foil or a metal mesh.

11. The oxygen permeable sheet in accordance with claim 6, wherein said substrate has a form of a microporous film.

12. The oxygen permeable sheet in accordance with claim 6, wherein the oxygen permeable sheet has a ratio of a cumulative pore volume S1 in a diameter range of 0.01 μm to 0.5 μm to a cumulative pore volume S2 in a diameter range of 0.01 μm to 10 μm: S1/S2 of not less than 0.01 and not more than 0.8.

13. The oxygen permeable sheet in accordance with claim 6, wherein said oxygen permeable sheet has a Gurley number of not less than 0.5 seconds and not more than 50000 seconds.

14. An air cell comprising a positive electrode, a negative electrode, an electrolyte and an air intake mechanism for supplying air to said positive electrode,
wherein said air intake mechanism comprises the oxygen permeable film according to claim 1.

15. An air cell comprising a positive electrode, a negative electrode, an electrolyte and an air intake mechanism for supplying air to said positive electrode,
wherein said air intake mechanism comprises the oxygen permeable sheet according to claim 6.

16. A fuel cell comprising a cathode, an anode, an electrolyte and an air intake mechanism for supplying air to said cathode,
wherein said air intake mechanism comprises the oxygen permeable film according to claim 1.

17. A fuel cell comprising a cathode, an anode, an electrolyte and an air intake mechanism for supplying air to said cathode,
wherein said air intake mechanism comprises the oxygen permeable sheet according to claim 6.

* * * * *